US011946423B2

(12) United States Patent
Serrano et al.

(10) Patent No.: US 11,946,423 B2
(45) Date of Patent: Apr. 2, 2024

(54) RECHARGING MANAGEMENT FOR SKIPPING CYLINDERS

(71) Applicants: Tula Technology, Inc., San Jose, CA (US); Cummins, Inc., Columbus, IN (US)

(72) Inventors: Louis Joe Serrano, Los Gatos, CA (US); Xiaoping Cai, Fremont, CA (US); Yongyan Cao, San Jose, CA (US); Vijay Srinivasan, Farmington Hills, MI (US); Kevin Shikui Chen, San Jose, CA (US); Andrea Marie Evans, Columbus, IN (US); Avra Brahma, Fishers, IN (US)

(73) Assignee: Tula Technology, Inc., San Jose, CA (US)

( * ) Notice: Subject to any disclaimer, the term of this patent is extended or adjusted under 35 U.S.C. 154(b) by 5 days.

(21) Appl. No.: 17/373,247

(22) Filed: Jul. 12, 2021

(65) Prior Publication Data

US 2022/0065182 A1 Mar. 3, 2022

Related U.S. Application Data

(60) Provisional application No. 63/071,295, filed on Aug. 27, 2020.

(51) Int. Cl.
*F02D 41/00* (2006.01)
*F02D 35/02* (2006.01)
(Continued)

(52) U.S. Cl.
CPC ....... *F02D 41/0087* (2013.01); *F02D 35/024* (2013.01); *F02D 41/0007* (2013.01);
(Continued)

(58) Field of Classification Search
CPC ............... F02D 41/0087; F02D 35/024; F02D 41/0007; F02D 41/0055; F02D 41/0077;
(Continued)

(56) References Cited

U.S. PATENT DOCUMENTS 4,129,109 A 12/1978 Matsumoto
4,509,488 A * 4/1985 Forster .................... F02P 9/002 123/481

(Continued)

FOREIGN PATENT DOCUMENTS

DE 102005057505 A1 * 6/2006 ............ F01N 11/002
DE 102016110208 A1 * 12/2017 ............ F02D 17/02

(Continued)

OTHER PUBLICATIONS

Wilcutts et al., "Electrified Dynamie Skip Fire (eDSF): Design and Benefits," SAE Technical Paper 2018-01-0864, 2018, https://doi.org/10.4271/2018-01-0864.

(Continued)

*Primary Examiner* — Sizo B Vilakazi
*Assistant Examiner* — Brian R Kirby
(74) *Attorney, Agent, or Firm* — Womble Bond Dickinson (US) LLP

(57) ABSTRACT

A variety of methods and arrangements are described for managing recharging of cylinders of an internal combustion engine during skip fire operation of the engine. In one method, a maximum allowed deactivation time for a cylinder is determined and the cylinder is recharged before the maximum allowed deactivation time is exceeded.

37 Claims, 13 Drawing Sheets

(51) Int. Cl.
*F02D 41/14* (2006.01)
*F02D 41/38* (2006.01)

(52) U.S. Cl.
CPC ..... *F02D 41/0055* (2013.01); *F02D 41/0077* (2013.01); *F02D 41/1401* (2013.01); *F02D 41/38* (2013.01); *F02D 2041/0012* (2013.01); *F02D 2041/141* (2013.01); *F02D 2041/1433* (2013.01); *F02D 2200/0406* (2013.01)

(58) Field of Classification Search
CPC ................ F02D 41/1401; F02D 41/38; F02D 2041/0012; F02D 2041/141; F02D 2041/1433; F02D 2200/0406; F02D 17/02; F02D 41/024; F02D 35/023; F02D 41/40
USPC ............................................... 123/198 F, 481
See application file for complete search history.

(56) References Cited

U.S. PATENT DOCUMENTS

| | | | | | |
|---|---|---|---|---|---|
| 5,123,391 | A * | 6/1992 | Ohkubo | F02D 35/023 | 123/494 |
| 5,377,631 | A * | 1/1995 | Schechter | F02D 13/06 | 123/198 F |
| 5,408,966 | A * | 4/1995 | Lipinski | F01L 13/0005 | 123/481 |
| 5,617,829 | A * | 4/1997 | Bidner | F02P 15/006 | 123/481 |
| 6,647,947 | B2 * | 11/2003 | Boyer | F02P 5/1504 | 123/198 F |
| 7,028,661 | B1 * | 4/2006 | Bonne | F02D 41/0087 | 123/198 F |
| 7,143,727 | B1 * | 12/2006 | Winstead | F01N 3/0842 | 123/481 |
| 7,577,511 | B1 | 8/2009 | Tripathi et al. | | |
| 7,849,835 | B2 | 12/2010 | Tripathi et al. | | |
| 7,886,715 | B2 | 2/2011 | Tripathi et al. | | |
| 7,954,474 | B2 | 6/2011 | Tripathi et al. | | |
| 8,099,224 | B2 | 1/2012 | Tripathi et al. | | |
| 8,131,445 | B2 | 3/2012 | Tripathi et al. | | |
| 8,131,447 | B2 | 3/2012 | Tripathi et al. | | |
| 8,616,181 | B2 | 12/2013 | Sahandiesfanjani et al. | | |
| 8,701,628 | B2 | 4/2014 | Tripathi et al. | | |
| 9,086,020 | B2 | 7/2015 | Pirjaberi et al. | | |
| 9,120,478 | B2 | 9/2015 | Carlson et al. | | |
| 9,200,587 | B2 | 12/2015 | Serrano | | |
| 9,239,037 | B2 | 1/2016 | Carlson et al. | | |
| 9,267,454 | B2 | 2/2016 | Wilcutts et al. | | |
| 9,273,643 | B2 | 3/2016 | Carlson et al. | | |
| 9,291,106 | B2 | 3/2016 | Switkes et al. | | |
| 9,328,672 | B2 | 5/2016 | Serrano et al. | | |
| 9,650,971 | B2 | 5/2017 | Pirjaberi et al. | | |
| 9,664,130 | B2 | 5/2017 | Wilcutts et al. | | |
| 9,689,327 | B2 | 6/2017 | Younkins et al. | | |
| 9,784,644 | B2 | 10/2017 | Chen et al. | | |
| 9,945,313 | B2 | 4/2018 | Kotwicki et al. | | |
| 9,988,997 | B2 * | 6/2018 | VanDerWege | F02D 41/1446 | |
| 10,024,256 | B2 * | 7/2018 | Richards | F02D 41/0087 | |
| 10,323,588 | B2 | 6/2019 | Vanderwege | | |
| 10,337,418 | B2 * | 7/2019 | Rollinger | F02D 17/02 | |
| 10,619,584 | B2 | 4/2020 | Fuschetto et al. | | |
| 2003/0098009 | A1 * | 5/2003 | Saito | F02D 41/3082 | 123/305 |
| 2005/0131618 | A1 * | 6/2005 | Megli | F02D 13/0257 | 701/101 |
| 2005/0166888 | A1 * | 8/2005 | Rutten | F02D 41/0087 | 123/198 F |
| 2005/0217246 | A1 * | 10/2005 | Naik | F02D 41/0275 | 123/295 |
| 2006/0130459 | A1 * | 6/2006 | Warner | F01N 3/023 | 60/285 |
| 2006/0169245 | A1 * | 8/2006 | Zillmer | F02D 41/126 | 123/299 |
| 2007/0215107 | A1 * | 9/2007 | Shelby | F02P 17/12 | 123/481 |
| 2011/0137543 | A1 * | 6/2011 | Gibson | F02D 41/3076 | 123/299 |
| 2015/0233289 | A1 * | 8/2015 | Younkins | F02D 35/023 | 73/114.79 |
| 2015/0308355 | A1 * | 10/2015 | Moscherosch | F02D 17/02 | 123/344 |
| 2016/0108825 | A1 * | 4/2016 | Rumpsa | F02D 17/02 | 123/332 |
| 2016/0108828 | A1 * | 4/2016 | Glugla | F02D 35/025 | 123/344 |
| 2016/0108835 | A1 * | 4/2016 | Kees | F02D 41/0007 | 123/344 |
| 2016/0115884 | A1 * | 4/2016 | VanDerWege | F02D 41/1446 | 123/481 |
| 2016/0146121 | A1 * | 5/2016 | Carlson | F01N 11/007 | 60/276 |
| 2016/0146136 | A1 * | 5/2016 | Surnilla | F02D 15/00 | 123/481 |
| 2016/0222899 | A1 * | 8/2016 | Glugla | F02D 41/1446 | |
| 2017/0045001 | A1 * | 2/2017 | Haizaki | F02D 13/02 | |
| 2017/0114729 | A1 * | 4/2017 | Ashikaga | F01L 1/2405 | |
| 2017/0204799 | A1 * | 7/2017 | Follen | F02D 41/008 | |
| 2017/0370310 | A1 | 12/2017 | Kotwicki et al. | | |
| 2018/0080398 | A1 * | 3/2018 | Leone | F02D 41/0087 | |
| 2018/0223745 | A1 * | 8/2018 | Atterberry | F02D 41/0025 | |
| 2019/0178168 | A1 * | 6/2019 | McCarthy, Jr. | F02D 13/06 | |
| 2019/0345863 | A1 | 11/2019 | Shipp et al. | | |
| 2020/0018197 | A1 * | 1/2020 | McCarthy, Jr. | F02D 41/0087 | |
| 2020/0025050 | A1 | 1/2020 | Chen et al. | | |

FOREIGN PATENT DOCUMENTS

| | | | | |
|---|---|---|---|---|
| DE | 102018203935 A1 * | 5/2019 | | |
| JP | 2000034941 A * | 2/2000 | | |
| JP | 2005105869 A * | 4/2005 | F02D 41/0087 | |
| JP | 2015194097 A * | 11/2015 | | |
| JP | 2016151199 A * | 8/2016 | | |
| WO | WO-2006017870 A2 * | 2/2006 | F02D 13/06 | |

OTHER PUBLICATIONS

International Search Report and Written Opinion dated Oct. 19, 2021, in PCT Application No. PCT/US2021/041235.

International Search Report and Written Opinion for PCT/US2021/041235, dated Mar. 9, 2023, 12 pages.

* cited by examiner

| Engine Speed (rpm) | | 600 | 800 | 1000 | 1200 | 1400 | 1600 | 1800 |
|---|---|---|---|---|---|---|---|---|
| Intake Manifold Pressure (kPa) | 100 | p00 | p01 | p02 | p03 | p04 | p05 | p06 |
| | 150 | p10 | p11 | p12 | p13 | p14 | p15 | p16 |
| | 200 | p20 | p21 | p22 | p23 | p24 | p25 | p26 |
| | 250 | p30 | p31 | p32 | p33 | p34 | p35 | p36 |
| | 300 | p40 | p41 | p42 | p43 | p44 | p45 | p46 |
| | 350 | p50 | p51 | p52 | p53 | p54 | p55 | p56 |
| | 400 | p60 | p61 | p62 | p63 | p64 | p65 | p66 |

FIG. 8

| Skip Cycle Counter After Recharging | 1 | 2 | 3 | 4 | 5 | 6 | 7 | 8 | 9 | 10 |
|---|---|---|---|---|---|---|---|---|---|---|
| Decay Multiplier | 1.000 | 0.733 | 0.624 | 0.528 | 0.465 | 0.424 | 0.397 | 0.379 | 0.368 | 0.360 |

FIG. 9

| Cylinder A | Cylinder B | Cylinder C | Cylinder D | Cylinder E | Cylinder F |
|---|---|---|---|---|---|
| X | F | X | F | X | F |
| X | F | X | F | X | F |
| X | F | X | F | X | F |
| X | F | RC | F | X | F |
| X | F | X | F | X | F |
| X | F | X | F | X | F |
| X | F | X | F | X | F |
| RC | F | X | F | X | F |
| X | F | X | F | X | F |
| X | F | X | F | X | F |
| X | F | X | F | RC | F |
| X | F | X | F | X | F |
| X | F | X | F | X | F |
| X | F | X | F | X | F |
| X | F | RC | F | X | F |
| X | F | X | F | X | F |
| X | F | X | F | X | F |
| X | F | X | F | X | F |
| RC | F | X | F | X | F |
| X | F | X | F | X | F |

FIG. 10

| Engine Speed (rpm) | | 600 | 800 | 1000 | 1200 | 1400 | 1600 | 1800 |
|---|---|---|---|---|---|---|---|---|
| Δ Pressure EMP – IMP (kPa) | 0 | t00 | t01 | t02 | t03 | t04 | t05 | t06 |
| | 20 | t10 | t11 | t12 | t13 | t14 | t15 | t16 |
| | 40 | t20 | t21 | t22 | t23 | t24 | t25 | t26 |
| | 60 | t30 | t31 | t32 | t33 | t34 | t35 | t36 |
| | 80 | t40 | t41 | t42 | t43 | t44 | t45 | t46 |
| | 100 | t50 | t51 | t52 | t53 | t54 | t55 | t56 |
| | 120 | t60 | t61 | t62 | t63 | t64 | t65 | t66 |

FIG. 11

| | cylinder A | cylinder B | cylinder C | cylinder D | cylinder E | cylinder F |
|---|---|---|---|---|---|---|
| cycle 1 | fire | skip | skip | recharge | fire | skip |
| cycle 2 | skip | skip | fire | skip | skip | skip |
| cycle 3 | fire | skip | skip | skip | fire | skip |
| cycle 4 | skip | skip | fire | skip | skip | skip |
| cycle 5 | fire | recharge | skip | skip | fire | skip |
| cycle 6 | skip | skip | fire | skip | skip | skip |
| cycle 7 | fire | skip | skip | skip | fire | skip |
| cycle 8 | skip | skip | fire | skip | skip | recharge |
| cycle 9 | fire | skip | skip | skip | fire | skip |
| cycle 10 | skip | skip | fire | skip | skip | skip |
| cycle 11 | fire | skip | skip | skip | fire | skip |
| cycle 12 | skip | skip | fire | skip | skip | skip |

FIG. 12

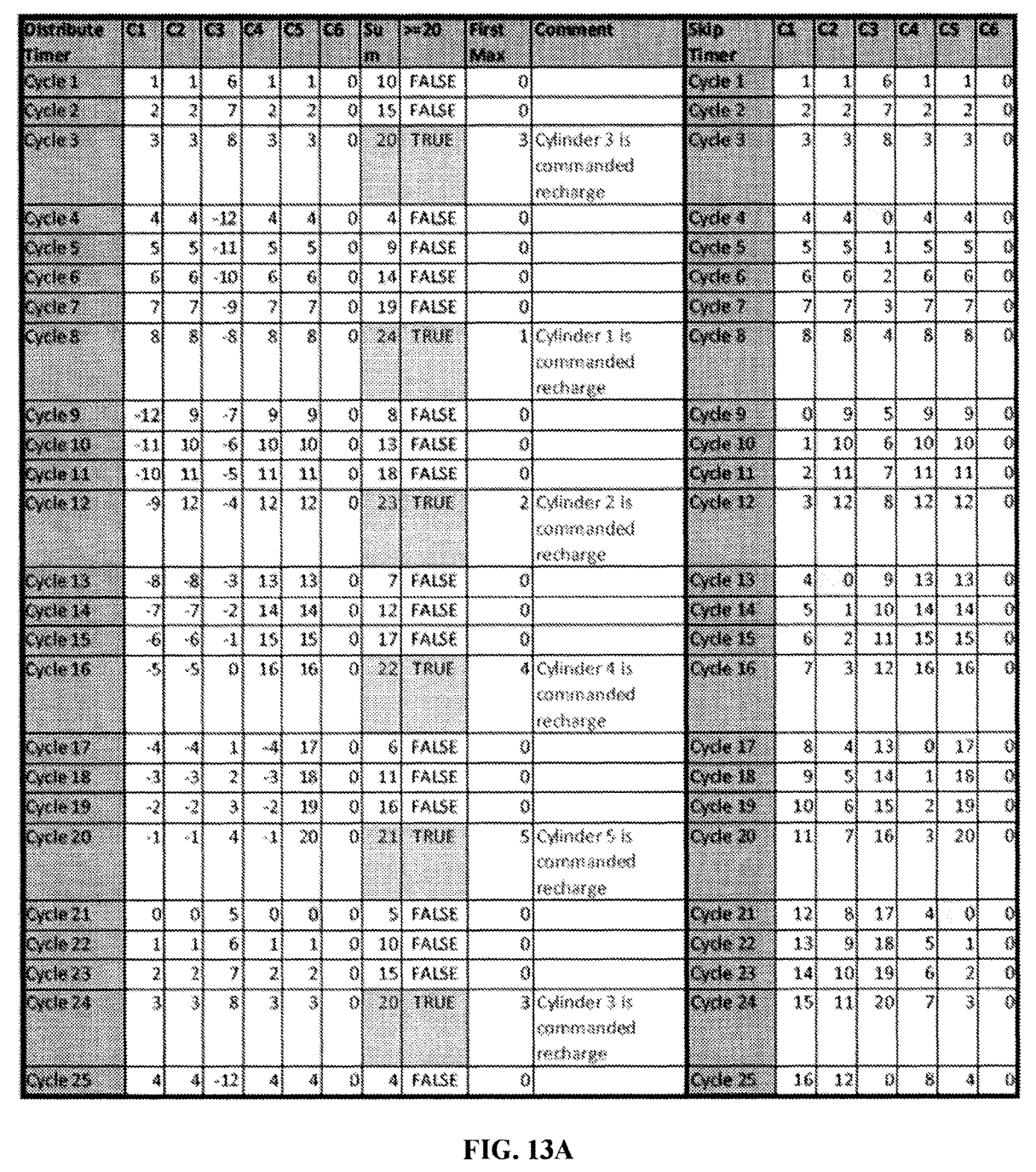

| Distribute Timer | C1 | C2 | C3 | C4 | C5 | C6 | Sum | >=20 | First Max | Comment |
|---|---|---|---|---|---|---|---|---|---|---|
| Cycle 1 | 1 | 1 | 6 | 1 | 1 | 0 | 10 | FALSE | 0 | |
| Cycle 2 | 2 | 2 | 7 | 2 | 2 | 0 | 15 | FALSE | 0 | |
| Cycle 3 | 3 | 3 | 8 | 3 | 3 | 0 | 20 | TRUE | 3 | Cylinder 3 is commanded recharge |
| Cycle 4 | 4 | 4 | -12 | 4 | 4 | 0 | 4 | FALSE | 0 | |
| Cycle 5 | 5 | 5 | -11 | 5 | 5 | 0 | 9 | FALSE | 0 | |
| Cycle 6 | 6 | 6 | -10 | 6 | 6 | 0 | 14 | FALSE | 0 | |
| Cycle 7 | 7 | 7 | -9 | 7 | 7 | 0 | 19 | FALSE | 0 | |
| Cycle 8 | 8 | 8 | -8 | 8 | 8 | 0 | 24 | TRUE | 1 | Cylinder 1 is commanded recharge |
| Cycle 9 | -12 | 9 | -7 | 9 | 9 | 0 | 8 | FALSE | 0 | |
| Cycle 10 | -11 | 10 | -6 | 10 | 10 | 0 | 13 | FALSE | 0 | |
| Cycle 11 | -10 | 11 | -5 | 11 | 11 | 0 | 18 | FALSE | 0 | |
| Cycle 12 | -9 | 12 | -4 | 12 | 12 | 0 | 23 | TRUE | 2 | Cylinder 2 is commanded recharge |
| Cycle 13 | -8 | -8 | -3 | 13 | 13 | 0 | 7 | FALSE | 0 | |
| Cycle 14 | -7 | -7 | -2 | 14 | 14 | 0 | 12 | FALSE | 0 | |
| Cycle 15 | -6 | -6 | -1 | 15 | 15 | 0 | 17 | FALSE | 0 | |
| Cycle 16 | -5 | -5 | 0 | 16 | 16 | 0 | 22 | TRUE | 4 | Cylinder 4 is commanded recharge |
| Cycle 17 | -4 | -4 | 1 | -4 | 17 | 0 | 6 | FALSE | 0 | |
| Cycle 18 | -3 | -3 | 2 | -3 | 18 | 0 | 11 | FALSE | 0 | |
| Cycle 19 | -2 | -2 | 3 | -2 | 19 | 0 | 16 | FALSE | 0 | |
| Cycle 20 | -1 | -1 | 4 | -1 | 20 | 0 | 21 | TRUE | 5 | Cylinder 5 is commanded recharge |
| Cycle 21 | 0 | 0 | 5 | 0 | 0 | 0 | 5 | FALSE | 0 | |
| Cycle 22 | 1 | 1 | 6 | 1 | 1 | 0 | 10 | FALSE | 0 | |
| Cycle 23 | 2 | 2 | 7 | 2 | 2 | 0 | 15 | FALSE | 0 | |
| Cycle 24 | 3 | 3 | 8 | 3 | 3 | 0 | 20 | TRUE | 3 | Cylinder 3 is commanded recharge |
| Cycle 25 | 4 | 4 | -12 | 4 | 4 | 0 | 4 | FALSE | 0 | |

| Skip Timer | C1 | C2 | C3 | C4 | C5 | C6 |
|---|---|---|---|---|---|---|
| Cycle 1 | 1 | 1 | 6 | 1 | 1 | 0 |
| Cycle 2 | 2 | 2 | 7 | 2 | 2 | 0 |
| Cycle 3 | 3 | 3 | 8 | 3 | 3 | 0 |
| Cycle 4 | 4 | 4 | 0 | 4 | 4 | 0 |
| Cycle 5 | 5 | 5 | 1 | 5 | 5 | 0 |
| Cycle 6 | 6 | 6 | 2 | 6 | 6 | 0 |
| Cycle 7 | 7 | 7 | 3 | 7 | 7 | 0 |
| Cycle 8 | 8 | 8 | 4 | 8 | 8 | 0 |
| Cycle 9 | 0 | 9 | 5 | 9 | 9 | 0 |
| Cycle 10 | 1 | 10 | 6 | 10 | 10 | 0 |
| Cycle 11 | 2 | 11 | 7 | 11 | 11 | 0 |
| Cycle 12 | 3 | 12 | 8 | 12 | 12 | 0 |
| Cycle 13 | 4 | 0 | 9 | 13 | 13 | 0 |
| Cycle 14 | 5 | 1 | 10 | 14 | 14 | 0 |
| Cycle 15 | 6 | 2 | 11 | 15 | 15 | 0 |
| Cycle 16 | 7 | 3 | 12 | 16 | 16 | 0 |
| Cycle 17 | 8 | 4 | 13 | 0 | 17 | 0 |
| Cycle 18 | 9 | 5 | 14 | 1 | 18 | 0 |
| Cycle 19 | 10 | 6 | 15 | 2 | 19 | 0 |
| Cycle 20 | 11 | 7 | 16 | 3 | 20 | 0 |
| Cycle 21 | 12 | 8 | 17 | 4 | 0 | 0 |
| Cycle 22 | 13 | 9 | 18 | 5 | 1 | 0 |
| Cycle 23 | 14 | 10 | 19 | 6 | 2 | 0 |
| Cycle 24 | 15 | 11 | 20 | 7 | 3 | 0 |
| Cycle 25 | 16 | 12 | 0 | 8 | 4 | 0 |

FIG. 13A

| Distribute Timer | C1 | C2 | C3 | C4 | C5 | C6 | Sum | >=20 | First Max | Comment | Skip Timer | C1 | C2 | C3 | C4 | C5 | C6 |
|---|---|---|---|---|---|---|---|---|---|---|---|---|---|---|---|---|---|
| Cycle 26 | 0 | 0 | 1 | 0 | 0 | 1 | 2 | FALSE | 0 | Distribute Timers C1/C2/C4/C5 are reset to 0 | Cycle 26 | 0 | 0 | 0 | 0 | 0 | 0 |
| Cycle 27 | 0 | 0 | 2 | 0 | 0 | 2 | 4 | FALSE | 0 | | Cycle 27 | 0 | 0 | 1 | 0 | 0 | 1 |
| Cycle 28 | 0 | 0 | 3 | 0 | 0 | 3 | 6 | FALSE | 0 | | Cycle 28 | 0 | 0 | 2 | 0 | 0 | 2 |
| Cycle 29 | 0 | 0 | 4 | 0 | 0 | 4 | 8 | FALSE | 0 | | Cycle 29 | 0 | 0 | 3 | 0 | 0 | 3 |
| Cycle 30 | 0 | 0 | 5 | 0 | 0 | 5 | 10 | FALSE | 0 | | Cycle 30 | 0 | 0 | 4 | 0 | 0 | 4 |
| Cycle 31 | 0 | 0 | 6 | 0 | 0 | 6 | 12 | FALSE | 0 | | Cycle 31 | 0 | 0 | 5 | 0 | 0 | 5 |
| Cycle 32 | 0 | 0 | 7 | 0 | 0 | 7 | 14 | FALSE | 0 | | Cycle 32 | 0 | 0 | 6 | 0 | 0 | 6 |
| Cycle 33 | 0 | 0 | 8 | 0 | 0 | 8 | 16 | FALSE | 0 | | Cycle 33 | 0 | 0 | 7 | 0 | 0 | 7 |
| Cycle 34 | 0 | 0 | 9 | 0 | 0 | 9 | 18 | FALSE | 0 | | Cycle 34 | 0 | 0 | 8 | 0 | 0 | 8 |
| Cycle 35 | 0 | 0 | 10 | 0 | 0 | 10 | 20 | TRUE | 0 | Cylinder 3 is commanded recharge | Cycle 35 | 0 | 0 | 9 | 0 | 0 | 9 |
| Cycle 36 | 0 | 0 | -10 | 0 | 0 | 11 | 1 | FALSE | 0 | | Cycle 36 | 0 | 0 | 0 | 0 | 0 | 10 |
| Cycle 37 | 0 | 0 | -9 | 0 | 0 | 12 | 3 | FALSE | 0 | | Cycle 37 | 0 | 0 | 1 | 0 | 0 | 11 |
| Cycle 38 | 0 | 0 | -8 | 0 | 0 | 13 | 5 | FALSE | 0 | | Cycle 38 | 0 | 0 | 2 | 0 | 0 | 12 |
| Cycle 39 | 0 | 0 | -7 | 0 | 0 | 14 | 7 | FALSE | 0 | | Cycle 39 | 0 | 0 | 3 | 0 | 0 | 13 |
| Cycle 40 | 0 | 0 | -6 | 0 | 0 | 15 | 9 | FALSE | 0 | | Cycle 40 | 0 | 0 | 4 | 0 | 0 | 14 |
| Cycle 41 | 0 | 0 | -5 | 0 | 0 | 16 | 11 | FALSE | 0 | | Cycle 41 | 0 | 0 | 5 | 0 | 0 | 15 |
| Cycle 42 | 0 | 0 | -4 | 0 | 0 | 17 | 13 | FALSE | 0 | | Cycle 42 | 0 | 0 | 6 | 0 | 0 | 16 |
| Cycle 43 | 0 | 0 | -3 | 0 | 0 | 18 | 15 | FALSE | 0 | | Cycle 43 | 0 | 0 | 7 | 0 | 0 | 17 |
| Cycle 44 | 0 | 0 | -2 | 0 | 0 | 19 | 17 | FALSE | 0 | | Cycle 44 | 0 | 0 | 8 | 0 | 0 | 18 |
| Cycle 45 | 0 | 0 | -1 | 0 | 0 | 20 | 19 | FALSE | 0 | | Cycle 45 | 0 | 0 | 9 | 0 | 0 | 19 |
| Cycle 46 | 0 | 0 | 0 | 0 | 0 | 21 | 21 | TRUE | 6 | Cylinder 6 is commanded recharge | Cycle 46 | 0 | 0 | 10 | 0 | 0 | 20 |
| Cycle 47 | 0 | 0 | 1 | 0 | 0 | 1 | 2 | FALSE | 0 | | Cycle 47 | 0 | 0 | 11 | 0 | 0 | 0 |
| Cycle 48 | 0 | 0 | 2 | 0 | 0 | 2 | 4 | FALSE | 0 | | Cycle 48 | 0 | 0 | 12 | 0 | 0 | 1 |
| Cycle 49 | 0 | 0 | 3 | 0 | 0 | 3 | 6 | FALSE | 0 | | Cycle 49 | 0 | 0 | 13 | 0 | 0 | 2 |

FIG. 13B

RECHARGING MANAGEMENT FOR SKIPPING CYLINDERS

CROSS-REFERENCE TO RELATED APPLICATIONS

This application claims priority from U.S. Provisional Patent Application No. 63/071,295 filed Aug. 27, 2020, the entire contents of which is incorporated herein by reference.

FIELD OF THE INVENTION

This present invention relates generally to recharging management of cylinders of an internal combustion engine during skip fire operation, and more specifically to recharging cylinders when the in-cylinder pressure is too low.

BACKGROUND OF THE INVENTION

Fuel efficiency of many types of internal combustion engines can be improved by varying the displacement of the engine. This allows for the use of full displacement when full torque is required and the use of smaller displacements when full torque is not required. Engines that use standard cylinder deactivation (CDA) reduce engine displacement by deactivating subsets of cylinders. For example, an eight-cylinder engine can reduce its displacement by half by deactivating four cylinders. Likewise, a four-cylinder engine can reduce its displacement by half by deactivating two cylinders, or a six-cylinder engine can reduce its displacement to ⅓ by deactivating four cylinders. In all of these cases, the deactivated cylinders do not fire while the engine is operated at this reduced level of displacement. The firing patterns that arise in CDA are called fixed patterns, because the cylinders which skip are fixed during the entire time the engine is at that level of reduced displacement.

In contrast, engines that use skip-fire control can reduce engine displacement to other levels by deactivating one or more cylinders for one cycle, then firing these cylinders the next cycle, then skipping or firing them on a third cycle. In this method, for example, an eight-cylinder or four-cylinder engine can reduce its displacement to ⅓ by having each cylinder repeatedly skip, then fire, then skip. This reduction in engine displacement cannot be attained simply by deactivating a subset of cylinders. Certain firing patterns that arise in skip-fire operation are called rolling patterns, because the cylinders that deactivate change, each cycle causing the pattern of skips and fires to roll across the cylinders over time. In other words, a first engine cycle may have a first set of cylinders fired and a second engine cycle may have a different second set of cylinders fired while the engine remains at the same displacement level. An engine cycle is generally defined as the time required for all cylinders to complete the four distinct piston strokes (intake, compression, power/expansion, and exhaust), which generally requires two (2) rotations of the crankshaft (720 degrees) for a 4-stroke engine commonly used to supply motive power to a vehicle.

One issue that arises in an engine using only CDA is that the in-cylinder pressure of deactivated cylinders can drop over time, allowing oil to intrude from the crank case into the deactivated cylinder, thereby damaging the engine and/or increasing emissions. Because the cylinders use a rolling pattern having alternating skips and fires, this is much less of a problem with a skip-fire engine as compared to engines operating on fixed patterns. However, skip-fire engines also use fixed patterns to optimize the engine displacement, subjecting them to this problem of oil intrusion, too.

Most engines are not equipped with in-cylinder pressure measurement transducers because of their high cost and poor reliability and accuracy. Also, a high cost data acquisition system is required to acquire and process the data of the pressure measurement transducers.

If the recharging of cylinders is clustered together and each recharge is preceded by a re-exhaust event, several re-exhaust events will occur close together. This may result in a transient increase in exhaust flow, which can have a negative effect on both the exhaust gas recirculation (EGR) loop and turbo speed control. Also, if too many cylinders are commanded to be recharged in one engine cycle, the engine brake torque may drop significantly and/or generate noise, vibration, and harshness (NVH) issues. Further, if several recharging events occur close together, the exhaust gas temperature may fluctuate more than is desired, which can adversely affect the after-treatment system efficacy.

SUMMARY

A variety of methods for managing recharging of cylinders of an internal combustion engine during skip-fire operation of the engine are described. In at least one embodiment, a maximum allowed deactivation time for a cylinder is determined and the cylinder is recharged before the maximum allowed deactivation time is exceeded.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 8 shows an example look-up table for Minimum In-cylinder Pressure Right After Recharging according to embodiments of the present disclosure.

FIG. 9 shows an example look-up Table for Decay Rate according to embodiments of the present disclosure.

FIG. 10 shows an example Table of Recharging During One-half Firing Fraction according to embodiments of the present disclosure.

FIG. 11 shows an example Table of Recharging Torque Loss according to embodiments of the present disclosure.

FIG. 12 shows an example Table of Recharging Three Deactivated Cylinders are Recharged every Twelve Engine Cycles according to embodiments of the present disclosure.

FIG. 13A illustrates an example Distribute Timer and an example Skip Timer for a six cylinder engine with a Firing Fraction of ⅙ and a Firing pattern of S S S S S F with a maximum allowed deactivation time of 20 according to embodiments of the present disclosure.

FIG. 13B illustrates an example Distribute Timer and an example Skip Timer for a six cylinder engine with a Firing Fraction of ⅔ and a Firing pattern of F F S F F S with a maximum allowed deactivation time of 20 according to embodiments of the present disclosure.

DETAILED DESCRIPTION

Figure 1:
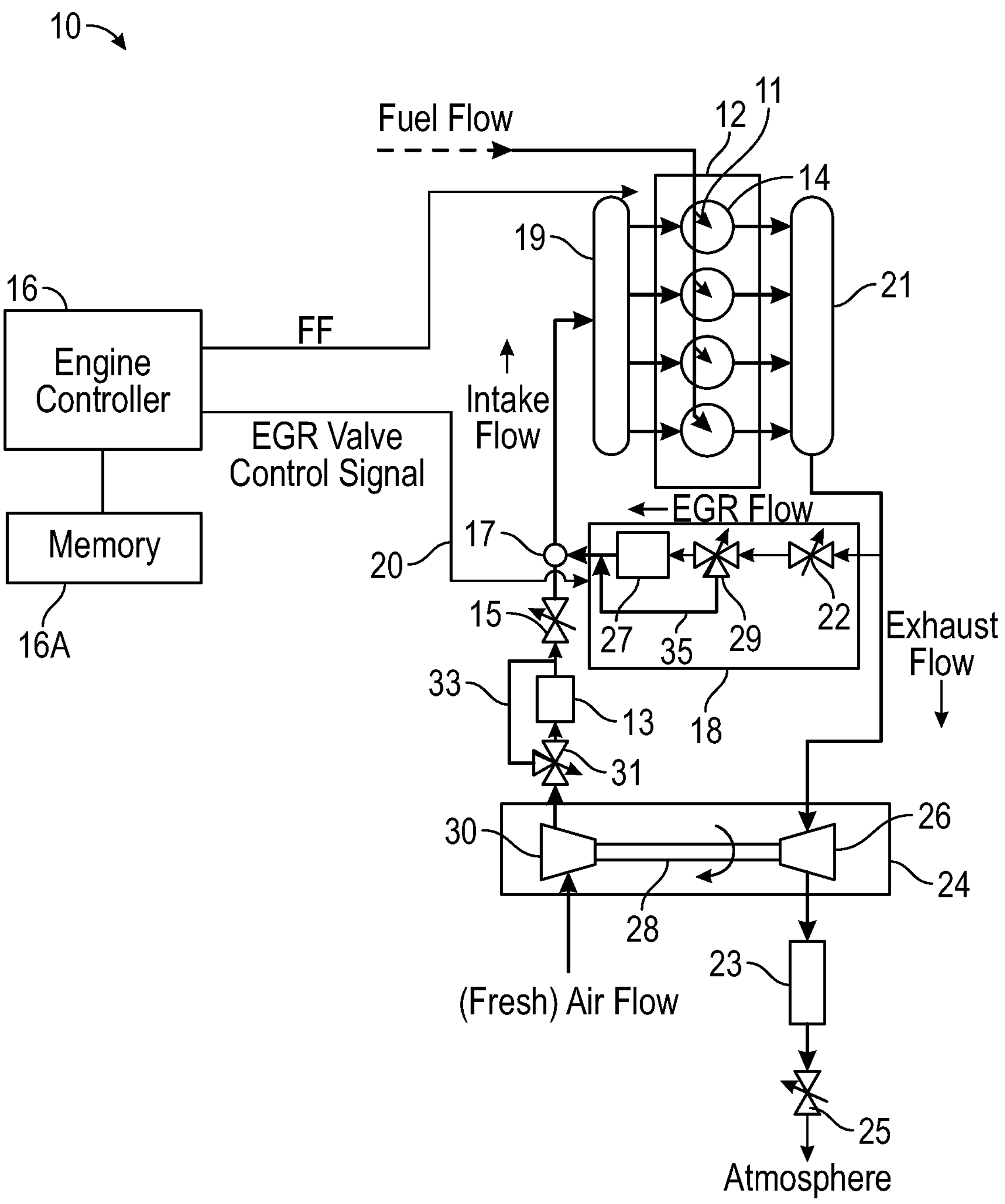
FIG. 1 shows a schematic of an internal combustion engine system.

The subject innovation is now described with reference to the drawings, wherein like reference numerals are used to refer to like elements throughout. In the following description, for purposes of explanation, numerals specific details are set forth in order to provide a thorough understanding of the present invention. It may be evident, however, that the present invention may be practiced without these specific details.

FIG. 1 illustrates an engine system 10 which includes, a variable displacement engine 12, having multiple cylinders 14 where combustion occurs. In the embodiment shown, the engine 12 includes four (4) cylinders 14. It should be understood that the engine 12 as illustrated is merely exemplary and may include either fewer or more cylinders than four (4) cylinders, such as, but not limited to 2, 3, 6, 8, 10, 12, or 16 cylinders. The engine 12 is controlled by an engine controller 16. The engine controller 16 performs all of the control functions described herein related to the recharging of the cylinders 14 of the engine 12.

The engine system 10 may include various elements in the intake and exhaust paths of the engine 12. On the intake path, fresh air may be drawn into a compressor 30, which is part of a turbocharger system 24. The output of the compressor 30 may be directed to a charge cooler bypass valve 31, which allows air to flow into an intercooler or charge air cooler 13 or to be diverted in a bypass 33 around the charge air cooler 13. The charge air cooler 13 lowers the temperature of the compressed air, which allows more air to be pumped through the engine (allowing a higher Mass Air Charge or "MAC"), thereby increasing the engine's maximum torque output. The inducted air then may flow through a throttle valve 15 and then into an exhaust gas recirculation (EGR) mixer 17 where exhaust gas may be introduced into the incoming fresh air. From the exhaust gas recirculation mixer 17 the air/EGR mixture may flow into an intake manifold 19 and from there into the engine's cylinders 14. Intake valves (not shown in FIG. 1) open and close to intermittently allow and block gas flow between the cylinders 14 and intake manifold 19. Fuel may be injected into each cylinder 14 by a fuel injector 11. The mixture of air, fuel, and possibly recirculated exhaust gas may combust in the cylinder 14 during an expansion or power stroke of a cylinder working cycle. The exhaust gases then may flow through an exhaust valve, (not shown in FIG. 1), which intermittently closes and opens to an exhaust manifold 21. From the exhaust manifold 21 a portion of the exhaust gas flow may be diverted by an Exhaust Gas Recirculation (EGR) system 18. The exhaust gas not flowing through the EGR system may then flow through a turbine 26 that is part of the turbocharger system 24. The exhaust gas flowing through the turbine 26 provides power to spin the compressor 30. The turbocharger system 24 may include a waste gate or variable vane or geometry turbine (not shown in FIG. 1) to control the amount of power extracted from the flowing exhaust gases. After leaving the turbocharger system 24 the flow may continue through an after-treatment system 23 that removes noxious pollutants in the exhaust gas. The exhaust gas may then flow through an optional exhaust throttle 25 and then out a tailpipe into the atmosphere.

The EGR system 18 may include an EGR valve 22 that adjustably controls the flow rate of exhaust gas back into the intake system. Also, in the EGR system 18 there may be an exhaust gas cooler 27 that cools the hot exhaust gases before introducing them into the intake system. An exhaust gas cooler bypass valve 29 allows some or all of the recirculated exhaust gas to be diverted around the exhaust gas cooler 27 in an exhaust gas bypass 35.

The engine system 10 may include various sensors (not shown in FIG. 1 for clarity). These sensors may be positioned at various locations on the engine 12, the intake system and the exhaust system. For example, the intake manifold 19 may have a pressure sensor, a temperature sensor, and an oxygen sensor. The exhaust manifold 21 may have a temperature sensor and a pressure sensor. There may be a mass flow sensor and an oxygen sensor positioned at the outlet of EGR system 18 before the exhaust gas enters the EGR mixer 17. There may be a mass flow sensor on the inlet to the compressor. There may be a temperature sensor positioned to monitor the after-treatment system 23 temperature. There may be $NO_x$ sensors in the exhaust system both prior to and after the after-treatment system 23. There may be a waste gate or turbocharger vane position sensor incorporated into the turbocharger system 24. These sensors may all provide signals to the engine controller 16 that allow the engine controller 16 to operate the engine 12 in an appropriate manner. The sensor signals may be used as part of a feedback loop in engine control. It should be appreciated that not all engine systems 10 use all of the above described sensors and in some cases additional sensors may be used.

The engine 12 can be a compression ignition engine, a spark-ignition (SI) engine, an engine that combines spark ignition with compression ignition, or an engine that ignites the air fuel mixture with a different technology.

The engine 12 can be any type of engine that is capable of selectively operating at full displacement or one or more reduced displacements.

In one embodiment, the engine 12 can be a "conventional" variable displacement engine where a group or bank of one or more cylinders may be selectively deactivated to reduce the effective displacement of the engine to less than full displacement (CDA). For example, with an eight-cylinder engine, groups of two, four or six cylinders may be selectively deactivated. The effective displacement of the engine 12 can be expressed in terms of a firing fraction. For instance, when a conventional eight-cylinder variable displacement engine is operating with two, four, or six cylinders deactivated, the firing fractions are ¾, ½ or ¼, respectively.

In another embodiment, the engine 12 can be skip-fire controlled. Skip-fire engine control contemplates selectively skipping the firing of certain cylinders 14 during selected firing opportunities. Thus, for a given effective engine displacement that is less than the full displacement, a particular cylinder 14 may be successively fired during one firing opportunity, skipped during the next firing opportunity and then selectively skipped or fired during the next firing opportunity. From an overall engine perspective, skip-fire control sometimes results in successive engine cycles having a different pattern of skipped and fired cylinders. This is contrasted with conventional variable displacement engine operation (CDA) in which a fixed set of the cylinders are deactivated during certain low-load operating conditions. The firing sequence may also be expressed as a firing fraction or firing density, either of which indicates a ratio of fired firing opportunities to total firing opportunities.

With skip-fire control, a much finer or refined engine control is possible than with conventional variable displacement engines. By way of comparison, fractions such as ⅓ may be implemented using skip-fire engine control but cannot be implemented with a conventional 4-cyclinder variable displacement engine. For instance, a commercially available skip-fire controller provides for seventeen (17) different firing fractions, each indicative of a different reduced effective engine displacement.

Skip-fire engine control is described in U.S. Pat. Nos. 7,954,474; 7,886,715; 7,849,835; 7,577,511; 8,099,224; 8,131,445; 8,131,447; 8,616,181; 8,701,628; 9,086,020; 9,120,478; 9,200,587; 9,650,971; 9,328,672; 9,239,037; 9,267,454; 9,273,643; 9,664,130; 9,945,313; and 9,291,106; each of which is incorporated herein by reference in its entirety for all purposes.

With certain implementations of skip-fire engine control, a decision to fire or not fire (skip) a given cylinder of an engine is made dynamically, meaning on a firing opportunity-by-firing opportunity or an engine cycle by engine cycle basis. In other words, prior to each successive firing opportunity or engine cycle, a decision is made to either fire or skip one firing opportunity or each firing opportunity in an engine cycle. In various embodiments, the firing sequence is determined on a firing opportunity by firing opportunity basis by using a sigma delta, or equivalently a delta sigma, converter. Such a skip fire control system may be defined as dynamic skip-fire control or "DSF." For more details on DSF, see U.S. Pat. Nos. 7,849,835, 9,086,020 and 9,200,575, 10,247,121, each incorporated by reference herein for all purposes.

As used herein the term "firing fraction" should thus be broadly interpreted and is applicable to any type of variable displacement engine, including but not limited to, conventional variable displacement engines, skip-fire controlled engines and DSF controlled engines.

The engine controller 16 is responsible for, among other tasks:

(a) Operating the engine 12 at one of multiple different displacements as needed to meet varying torque requests;

(b) Controlling the EGR system 18, by generating an EGR valve control signal 20, for controlling a position of an EGR valve 22. In various embodiments, the EGR valve control signal 20 may be generated in either the time domain or the crank angle domain; and (c) Controlling the recharging of the cylinders.

By adjusting the position of the EGR valve 22, the volume of the EGR flow from the exhaust manifold to the intake manifold of the engine 12 can be controlled. As described in detail below, control of the position of the EGR valve 22 may be used to eliminate spikes in hydrocarbon and/or $NO_x$ emissions during firing fraction transitions.

The engine controller 16 may include a memory 16A. The memory 16A may be any type of memory, including volatile or non-volatile memory, and is used to store data useful for determining (a) a firing fraction for operating the engine 12 and (b) a position for an EGR valve 22 of the EGR system 18 for each firing fraction. Such data may include tables, models derived from empirical data, algorithms, or any combination thereof. The memory 16A may also store the algorithms that implement the methods and control routines disclosed herein.

The EGR system 18 operates to recirculate a portion of the combusted exhaust gas back to the cylinders 14 of the engine 12. The amount of recirculation flow is selectively controlled by the variable EGR valve 22. During operation, the engine controller 16 generates the EGR valve control signal 20 that adjusts the EGR valve 22 to a more open or closed position. As a result, the volume of exhaust gas that is recirculated back to the cylinders 14 can be controlled for the purpose of mitigating or reducing hydrocarbon and/or $NO_x$ emissions.

The recirculation tends to dilute the fresh air intake stream into the cylinder 14 with gases inert to combustion or at least having a lower oxygen level than fresh air. The exhaust gases act as absorbents of combustion generated heat and reduce peak temperatures within the cylinders 14. As a result, $NO_x$ emissions are typically reduced. In a compression-ignition Diesel engine for instance, the exhaust gas replaces some of the oxygen in the pre-combustion mixture. Since $NO_x$ forms primarily when a mixture of nitrogen and oxygen is subjected to high temperature, the lower combustion temperatures and reduction in the amount of oxygen in the working chamber cause a reduction in the amount of generated NOR. However, if too much exhaust gas is present, then complete combustion within the fired cylinders 14 may not occur. As a result, a spike in non-combusted hydrocarbons may occur.

The optional turbocharger system 24 includes an exhaust turbine 26, a shaft 28, and a compressor wheel 30. The compressor wheel 30 is part of a compressor that serves to increase pressure in the intake manifold above atmospheric pressure. Air from the intake manifold is inducted into a cylinder 14 through one or more intake valve(s) on each cylinder. Boosting the supply of air into the cylinders 14 allows for the generation of more power compared to a naturally aspirated engine. With more air, proportionally more fuel can be input into the cylinders 14 without causing an increase in uncombusted hydrocarbons.

A supercharger or a twin-charger may be used to boost the air intake as well. The key difference between a turbocharger and a supercharger is that a supercharger is mechanically driven by the engine, often through a belt connected to the crankshaft, whereas a turbocharger is powered by a turbine driven by the exhaust gas of the engine. Compared with a mechanically driven supercharger, turbochargers tend to be more efficient, but less responsive. A twin-charger refers to an engine with both a supercharger and a turbocharger.

The present application is described primarily in the context of a six-cylinder internal combustion engine suitable for use in motor vehicles. It should be understood, however, that the present application as described herein may be used with any type of internal combustion engine, regardless of the type of combustion and/or may be used with any engine regardless of the number of cylinders, including 1, 2, 3, 4, 5, 6, 8, 10, 14 cylinders or engines with more or fewer cylinders than specifically recited herein. In addition, the internal combustion engine may use any type of combustible fuel, including but not limited to gasoline, diesel, ethanol, methanol, natural gas, or any combination thereof. Furthermore, the internal combustion engine may rely on various types of combustion and/or fuel charges, including but not limited to compression ignition, spark ignition, a stratified fuel charge, a homogeneous fuel charge, and a partial homogeneous charge. In addition, any of the engines described herein may be used for virtually any type of vehicle—including cars, trucks, locomotives, ships, boats, construction equipment, aircraft, motorcycles, scooters, etc.; and virtually any other application that involves the firing of cylinders in an internal combustion engine.

Figure 3:
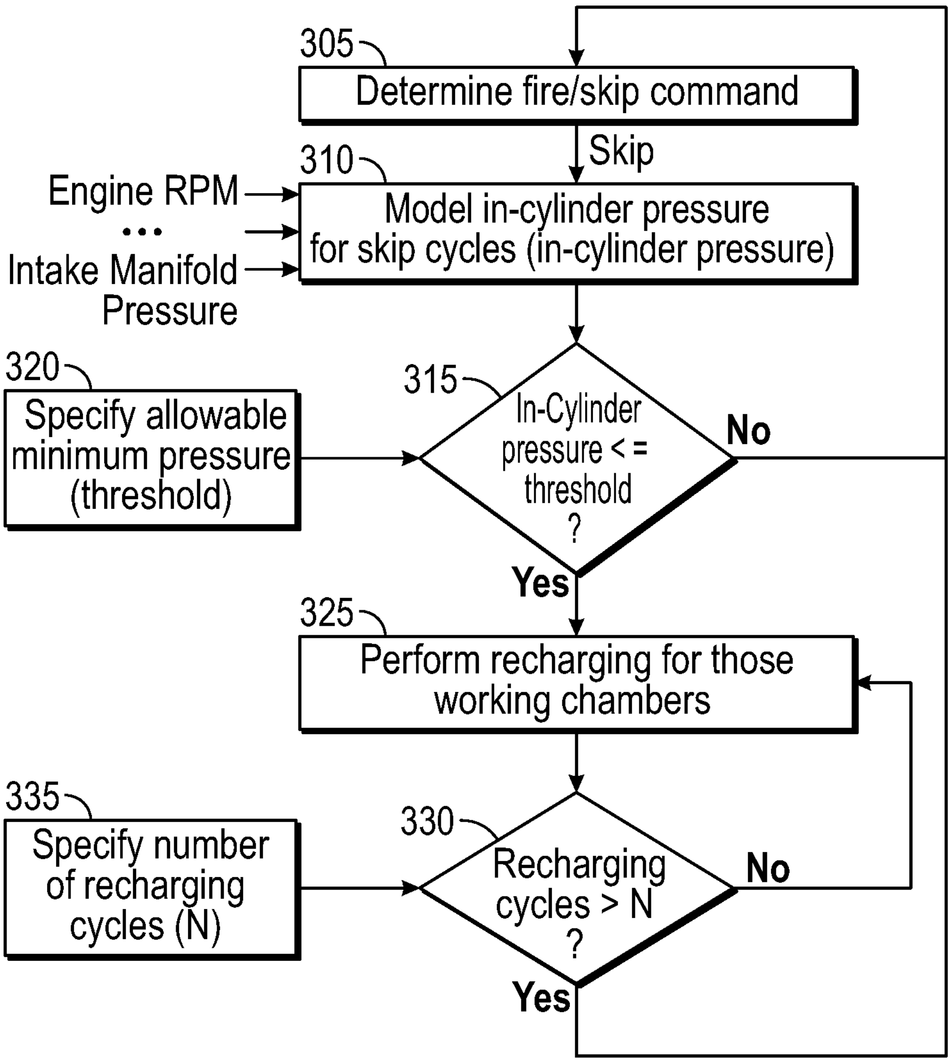
FIG. 3 shows a recharging logic flowchart of another embodiment.
Figure 4:
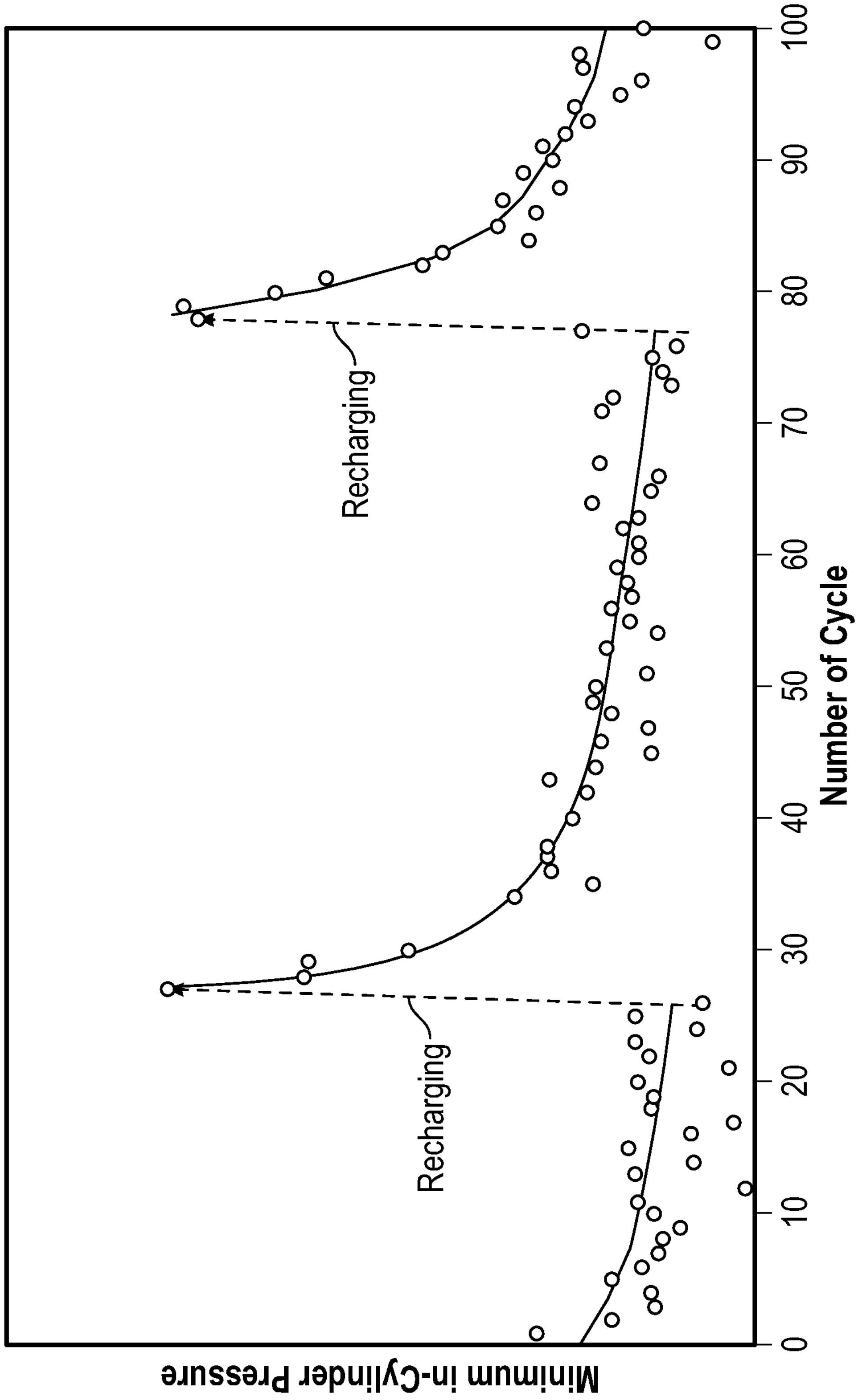
FIG. 4 shows example data that can incorporated into a look-up table for determining the in-cylinder pressure.

The skipped cylinders can be operated as one of several types of pneumatic springs, such as Low Pressure Exhaust Springs (LPES), High Pressure Exhaust Springs (HPES) and Air Springs (AS), as shown in U.S. Pat. No. 10,619,584, which is hereby incorporated by reference in its entirety. FIGS. 3-5 in U.S. Pat. No. 10,619,584 are for a naturally aspirated engine. These graphs will be somewhat different for a boosted engine. In general, LPES operation has the lowest in-cylinder pressure, followed by AS operation and HPES operation.

The maximum allowed deactivation time for a cylinder during skip-fire operation of the engine can be determined so that the skipped cylinders during skip-fire operation can be recharged before the in-cylinder pressure drops below a minimum predetermined pressure. This minimum predetermined pressure is the pressure below which an unacceptable level of oil is pulled into the cylinder from the crankcase. The minimum predetermined pressure can be set in the engine controller 16 (see FIG. 1) when the engine is manufactured. An example predetermined pressure can be 50 kPa, determined by measuring oil consumption or emissions on an engine dynamometer.

The term "recharging," can include the case where gas in the cylinder is vented into the exhaust manifold during an exhaust stroke, and then the cylinder inducts gas from the intake manifold during the immediately following intake stroke. Such an action generally may be preceded by the cylinder being skipped for one or more working cycles. The term "recharging" also can include the case where the cylinder inducts gas from the intake or exhaust manifold, but the cylinder is not vented into the exhaust manifold during the preceding working cycle. In both cases this can be done without fueling and firing the cylinder. The term "re-firing" comprises the case where the cylinder is fired after one or more successive skipped working cycles. Generally, fuel is injected into the cylinder during a re-fired working cycle; however, in some cases fuel may be injected during an earlier skipped working cycle and combusted in the re-fired working cycle. For a four-stroke engine, the term "working cycle" means the process by which a cylinder in the internal combustion engine completes the four distinct piston strokes: intake, compression, power/expansion, and exhaust. An "engine cycle" refers to all cylinders in the internal combustion engine completing a working cycle. The working cycles of an engine's cylinders are generally offset in phase. For example, in a four-cylinder engine during 180 degrees of crankshaft rotation one cylinder operates in an intake stroke, one cylinder operates in a compression stroke, one cylinder operates in an expansion stroke, and one cylinder operates in an exhaust stroke.

In at least one embodiment, individual cylinders can be monitored and when the in-cylinder pressure is determined to be at or below a predetermined pressure, the cylinder can be recharged.

In at least one embodiment, the allowed deactivation time can be modeled or determined from a look-up table at the start of the deactivation period. The allowed deactivation time could be a function of time or pressure, or one of time and pressure. Alternatively, the in-cylinder pressure can be modeled and deactivation can be allowed to continue until the modeled pressure reaches or is below a predetermined pressure. If the allowed deactivation time is exceeded, or the modeled pressure is too low, the cylinder can be recharged.

The in-cylinder pressure generally varies with several factors in addition to the length of time deactivated. Some of these factors are: the intake manifold absolute pressure (MAP) when the skipping begins; engine speed; whether the previous activation (recharge or firing) event was a re-intake without re-exhaust, re-exhaust and re-intake, or firing event; and the length of time the other cylinders have been deactivated.

Several methods, all of which are within the scope of the present invention, can be used to determine the recharge time. In one embodiment, the in-cylinder pressure is modeled for each cylinder based on several factors (e.g., MAP, engine speed, whether the last action was fire or pump, etc.) and each cycle the model for each cylinder is updated. When the predicted in-cylinder pressure within the cycle or at a certain crank angle or piston location is low, a recharge event is scheduled. The threshold for scheduling a recharge event can be made several cycles in advance (e.g., 1-3) to avoid too many recharge events in one cycle, making for a more even exhaust flow, which can be beneficial to turbo speed control, for example. The recharge event can be superseded if the cylinder is fired before the recharge is scheduled and, on that fire, the estimated in-cylinder pressure can be used with the fuel amount to determine if the cylinder still needs to be recharged (or the fuel limited) before firing. The requirements for recharging to improve in-cylinder pressure and recharging to meet air/fuel ratio requirements for a re-fire may be different. The type of recharge (e.g., re-exhaust and re-intake, or simply re-intake) can also be selected.

In another embodiment, the recharge time can be set when the cylinder first skips. The time can be determined from a predictive model, or from a lookup table. When a cylinder first skips, the model estimates the minimum in-cylinder pressure based on current engine conditions, as presented above. A decay rate is calculated and a time (or the number of engine cycles) before the in-cylinder pressure decays below a minimum pressure threshold is calculated.

In another embodiment, the number of cycles the cylinder can continue skipping before the in-cylinder pressure falls below the minimum in-cylinder pressure can be determined from a look-up table. For example, intake manifold absolute pressure (MAP) and engine speed can be used as the two axes of the look-up table, as shown in FIG. 8. A third axis could list recharge type of the cylinder (fire/re-exhaust and re-intake/just re-intake).

This recharge time can be used to reschedule a recharge event. The recharge event can be superseded if the cylinder is fired, and the timer is reset. As presented above, the recharge event can take the form of a re-exhaust and re-intake operation, or just a re-intake operation. The necessity of recharging prior to fueling and firing the cylinder can use a separate look-up table.

As presented above, the corrective action based on low in-cylinder pressure is a recharge of the cylinder. However, in an alternative embodiment, the firing fraction could be changed so that the cylinder is fired in a timely fashion. For example, a firing fraction of ½ will cause three of six cylinders to skip. Increasing it temporarily will cause the set of three cylinders that are skipped to fire, and those firing to skip. Or, the firing fraction could be changed from ½ to ⅗, which will change the firing pattern to a rolling pattern, with a maximum of one skip before a fire.

The in-pressure cylinder model can also be used to prevent over-fueling the cylinder. If the in-cylinder pressure is approximately known, an upper-bound on the amount of fuel that can be injected before creating an emissions problem can be determined. Either the fuel could be limited, or the cylinder could be recharged prior to fueling by either a re-exhaust and re-intake operation, or just a re-intake operation.

The pressure decay model can be used to decide the type of recharge to use. For example, if the in-cylinder pressure is high, no recharge is needed. If the in-cylinder pressure is too low, a re-exhaust and re-intake, or just re-intake can be used. Different time limits since last recharge or re-fire can also be used to determine this. Some factors determining the time limit are engine speed, whether the last action was a recharge or fire, engine load, MAP, etc.

The recharge operation can also take more than one cycle, if necessary. That is, when the deactivation of air flow is stopped, the cylinder can pump air to refresh one, two, or more times until deactivating again. For example, this could be done when there has been some oil intrusion or excessive exhaust gas leakage from the exhaust system into a cylinder. Using fewer cycles to recharge improves the exhaust temperature because the exhaust is less diluted with cool air.

Figure 2:
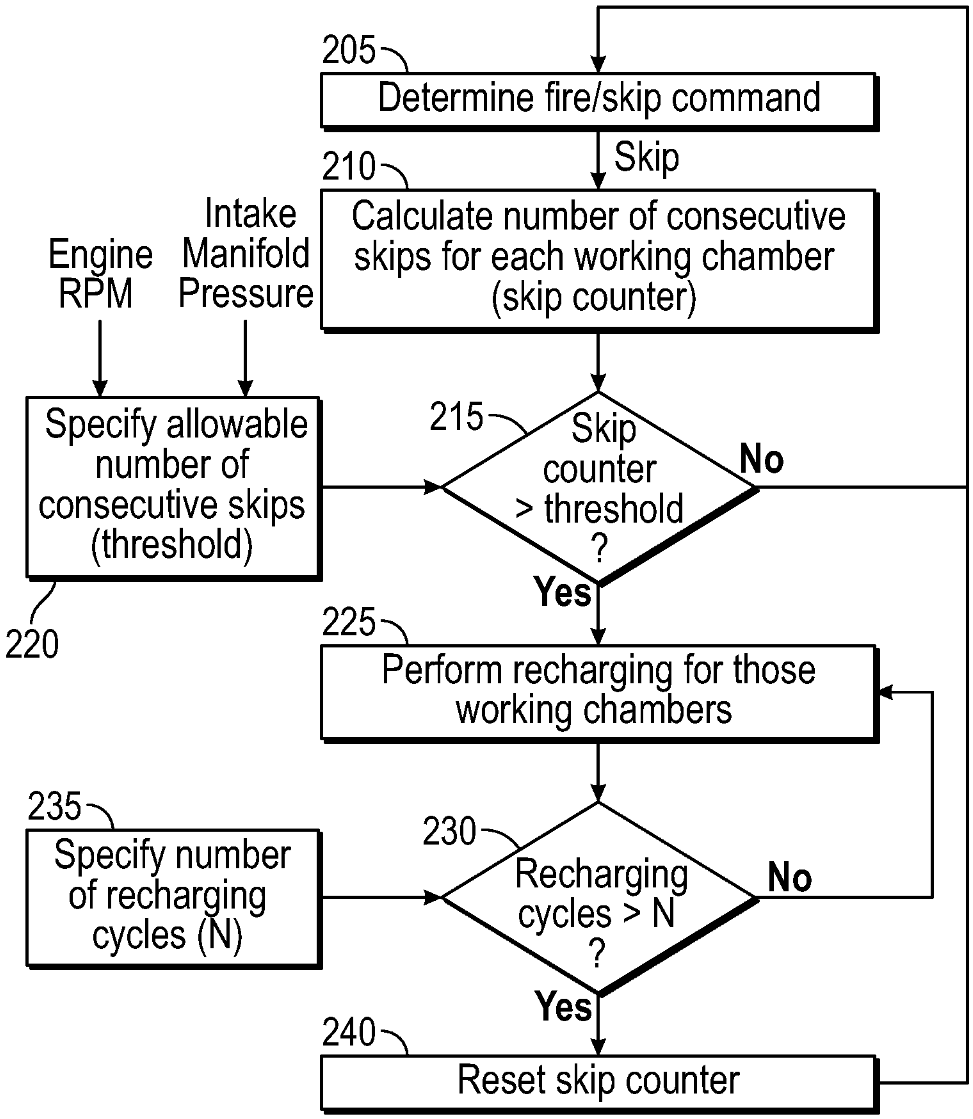
FIG. 2 shows a recharging logic flowchart.

FIG. 2 shows an example recharging logic of an embodiment of the present invention. This logic can be implemented in the engine controller 16 shown in FIG. 1, and can be implemented on a cylinder-by-cylinder basis. That is, each cylinder 14 can have its own separate recharging logic. This logic keeps track of the number of consecutive skips of each cylinder and when the number of consecutive skips of a cylinder exceeds a threshold, that cylinder is recharged. Specifically, as shown in FIG. 2, at Step 205 it is determined whether a cylinder is being fired or skipped. If the cylinder is being skipped (i.e., not fired), the number of consecutive skips for that cylinder is calculated at Step 210 as the Skip Counter. Next, at Step 215, the Skip Counter is compared to a Threshold, which equals the number of allowable consecutive skips for that cylinder. As shown in Step 220, the threshold can be specified based on various engine parameters such as engine speed and manifold pressure. Other engine parameters could be used. A look-up table could be used at Step 220 to compute the Threshold. When the Skip Counter exceeds the Threshold (Step 215 is Yes), that cylinder is commanded to recharge at Step 225. The recharging is performed for N engine cycles (see Step 230). N is nominally set to 1, but can be set to other values based on the engine parameters, such as engine speed, whether the last action was a recharge or fire, engine load, and MAP. (see Step 235). After the recharging is performed for N engine cycles, the Skip Counter is reset to zero (see Step 240), and the logic returns to Step 205 to restart the counting of the number of consecutive skips for each cylinder (Skip Counter).

FIG. 3 shows another example recharging logic of another embodiment of the present invention. This logic also can be implemented in the engine controller 16 shown in FIG. 1, and can be implemented on a cylinder-by-cylinder basis. That is, each cylinder 14 can have its own separate recharging logic. This logic of FIG. 3 models the in-cylinder pressure for each cylinder 14 and when the modeled in-cylinder pressure is less than a threshold, that cylinder is recharged. Specifically, as shown in FIG. 3, at Step 305 it is determined whether a cylinder is being fired or skipped. If the cylinder is being skipped (i.e., not fired), the modeled in-cylinder pressure for that cylinder is determined at Step 310. This can be done, for example, by a look-up table, a mathematical model or equations that may take inputs such as the engine speed and manifold pressure, or various other engine parameters. Next, at Step 315, the modeled in-cylinder pressure within the cycle or at a certain crank angle or piston location is compared to an allowable minimum pressure (Threshold), which equals the pressure below which an unacceptable amount of oil can enter the cylinder. As shown in Step 320, the Threshold can be specified based on various engine parameters. When the modeled in-cylinder pressure is at or below the allowable minimum pressure (Threshold) (Step 315 is Yes), that cylinder is commanded to recharge at Step 325. The recharging is performed for N engine cycles (see Step 330). N is nominally set to 1, but can be set to other values based on the engine parameters, such as engine speed, whether the last action was a recharge or fire, engine load, MAP. (see Step 335). After the recharging is performed for N engine cycles, the logic returns to Step 305 to update the modeled in-cylinder pressure.

The memory 16A (see FIG. 1) can include a non-transitory computer-readable medium on which instructions for performing the methods shown in FIGS. 2 and 3, and all other methods and functions disclosed herein, can be stored. The term "non-transitory computer-readable medium" can include a single medium or multiple media that store instructions, and can include any mechanism that stores information in a form readable by a computer, such as read-only memory (ROM), random-access memory (RAM), erasable programmable memory (EPROM and EEPROM), or flash memory.

All values of a look-up table for a threshold for an allowable number of skip cycles before recharging (see Step 220, FIG. 2) and an allowable minimum pressure (see Step 320, FIG. 3) can be created during testing and calibration performed during the development of the engine. Each engine type would have different values determined by the unique parameters of each engine. The in-cylinder pressure can be measured and how many cycles are needed to reach the desired minimum pressure are determined. A sample look-up table for determining the threshold for allowable number of skip cycles before recharging can be made using data such as that shown in FIG. 4. The pressure data shown in FIG. 4 can be determined by collecting in-cylinder pressure data on an engine dyno. The minimum in-cylinder pressure data vs engine cycle number is plotted and the number of cycles corresponding to desired threshold for minimum pressure is determined and entered into the corresponding speed/load cell. This can be repeated for other speed/load points. In addition, the in-cylinder pressure can be calculated at each crank angle. U.S. Pat. No. 9,784,644, which is hereby incorporated by reference in its entirely, discloses another pressure model that can estimate pressure in skipped cylinders.

For example, a 2-dimensional table for the initial minimum in-cylinder pressure right after recharging as a function of engine speed, intake manifold pressure could be used. An example table of such a 2-dimesnional table is shown in FIG. 8.

All of the look-up tables and equations referenced herein can be implemented in the control software stored in the memory 16A of the engine controller 16 (see FIG. 1). Similar considerations can be made for deciding how to recharge before re-firing a cylinder. The values shown in the above tables will be different than those for recharging due to an excessive number of skips.

As presented above, cylinders can be recharged when the maximum allowable deactivation time is exceeded, which helps prevent oil from being pulled into the cylinder from the crankcase and thereby prevent damage to the engine and an increase in emissions. However, if too many cylinders are recharged during the same engine cycle, the torque produced by the engine can become uneven and can cause uneven airflow and unacceptable NVH. For example, if three cylinders in a six-cylinder engine are being fired, and three deactivated, the three deactivated cylinders may all have been fired the engine cycle before entering the steady state, and so all will be commanded to recharge on the same engine cycle. Consequently, the air flow will change from firing three cylinders and deactivating three on one engine cycle to firing three cylinders and recharging three and then back again on the third engine cycle to firing three and deactivating three cylinders.

What is needed is a method to spread recharging events evenly during DSF so that effect on engine behavior is small. Therefore, it is beneficial to coordinate the recharging action of all of the cylinders so that they are well spaced. When it is determined that multiple deactivated cylinders need to be recharged, the recharging is spread evenly over multiple engine cycles. This can improve the smoothness of the exhaust flow, which in turn can improve turbo control and EGR control. Also, well-spaced re-charging can reduce exhaust temperature fluctuation to prevent the after-treatment system temperature from temporarily falling outside of desired temperature window, as well as reduce torque fluctuations due to increased pumping losses when a cylinder is recharged. A method of spreading recharging events is presented below.

1. If in a fixed pattern, determine a maximum allowed deactivation time N for the cylinders that are deactivated.
2. Pick a value M that is smaller than or equal to N and coprime with the number of deactivated cylinders
3. When the cylinders are deactivated, skip M−1 cylinder deactivation events, then recharge the Mth cylinder deactivation event
4. Repeat step 3 while the same set of cylinders are deactivated For example, in the embodiment shown in FIG. 10, a six-cylinder engine that fires three cylinders and skips three cylinders with a maximum deactivation time of 12 cylinder events (i.e., N=12), every $11^{th}$ skipped cylinder is recharged (i.e. M=11), as shown in FIG. 10. Cylinders A through F are fired sequentially in time and "F" indicates fire, "RC" indicates recharge, and "X" indicates deactivation.

As shown in FIG. 10, every $11^{th}$ skipped cylinder is recharged and there is a maximum of one recharging event per engine cycle.

In another embodiment, the recharging pattern can be generated using a first order sigma delta (FOSD) converter and a rational "recharging fraction," where the denominator of recharging fraction is co-prime with the number of deactivated cylinders, and the inverse of the recharging fraction is smaller than the maximum desired deactivation time. A first order sigma delta (FOSD) converter is described more fully in U.S. Pat. No. 9,200,587, which is hereby incorporated by reference in its entirety. For example, if the number of deactivated cylinders is 4 and the maximum deactivation time is 25 cycles, values of 1/21, 1/22, 1/23 or 2/49 would result in desirable recharging patterns. However, values 1/20 and 1/24 would result in one cylinder recharging every 5 or 6 cycles, and the other cylinders never recharging, which would create the negative side effects mentioned above, such as uneven torque generation and uneven airflow.

If a recharge of a cylinder is forced externally instead of a recommended skip for some reason, such as during a diagnostic, the event can be ignored, the accumulator in the FOSD can be reset to zero, or the recharging can be used by the FOSD as feedback instead of the requested skip.

If a rolling pattern deactivates a cylinder for too long, commanding a recharge a fixed number of cycles after the fire will naturally keep the air flow smooth. For example, consider an eight-cylinder engine with a limitation of recharging every 5 cycles. When a firing fraction of 1/9 is commanded, a cylinder will be deactivated for eight consecutive cycles. If a recharge is commanded after five cycles of deactivation, only one or two cylinders will be exhausted in any nine-cylinder time period. The time to recharge the cylinder after a fire can be based on the firing fraction in addition to the in-cylinder pressure requirement.

When cylinders are re-exhausted and refreshed prior to firing, recharge events can still cluster. For example, when the firing fraction increases from one half, half the cylinders may exhaust following a firing, while the other half may re-exhaust to refresh the cylinder contents prior to fueling. This can be mitigated either by using a re-intake refresh only (with no re-exhaust), or scheduling recharging events sufficiently often so that the need to re-exhaust before firing does not arise.

Figure 5A:
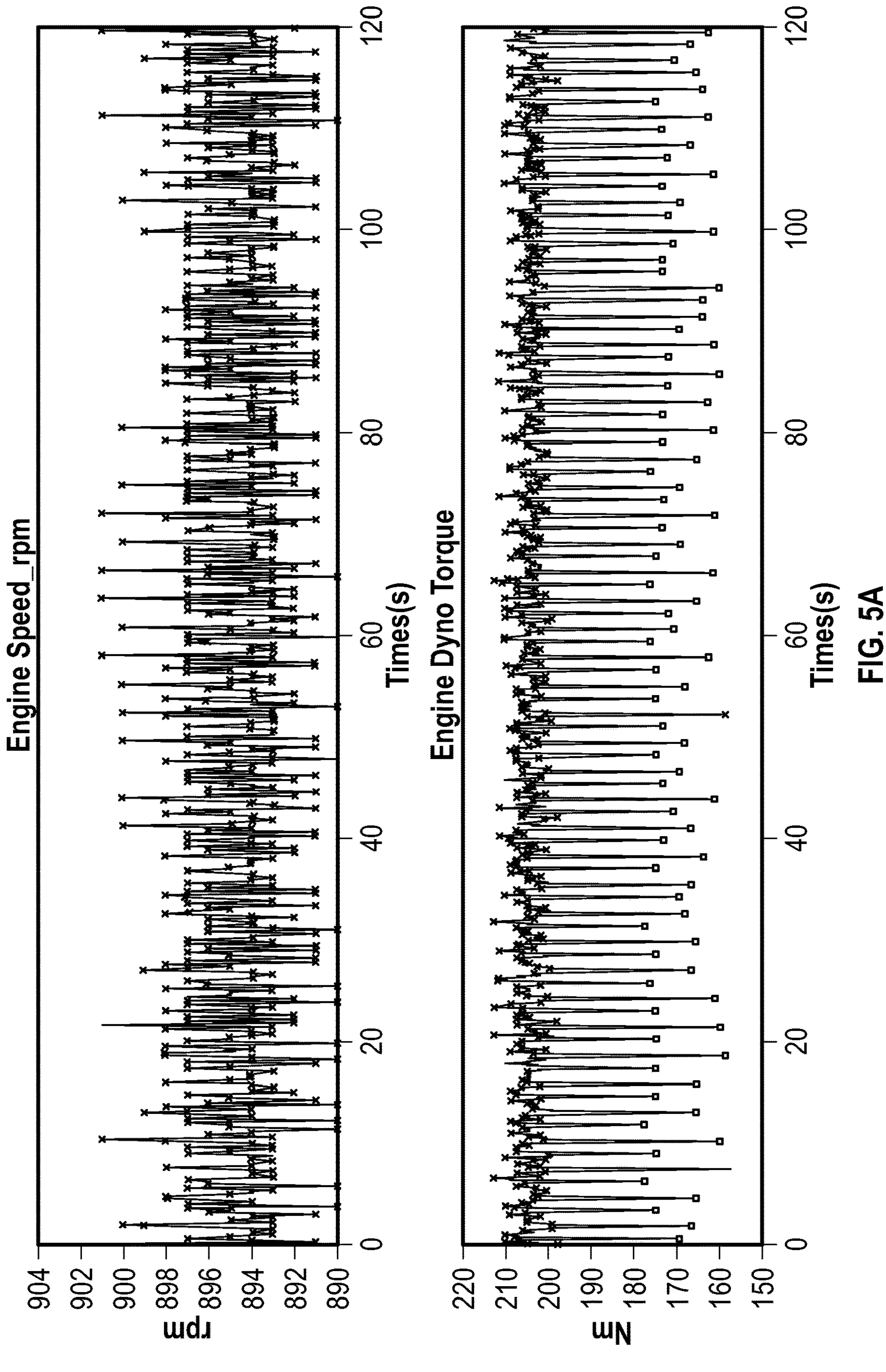
FIGS. 5A and 5B illustrate the negative torque due to pumping loss during recharging.
Figure 5B:
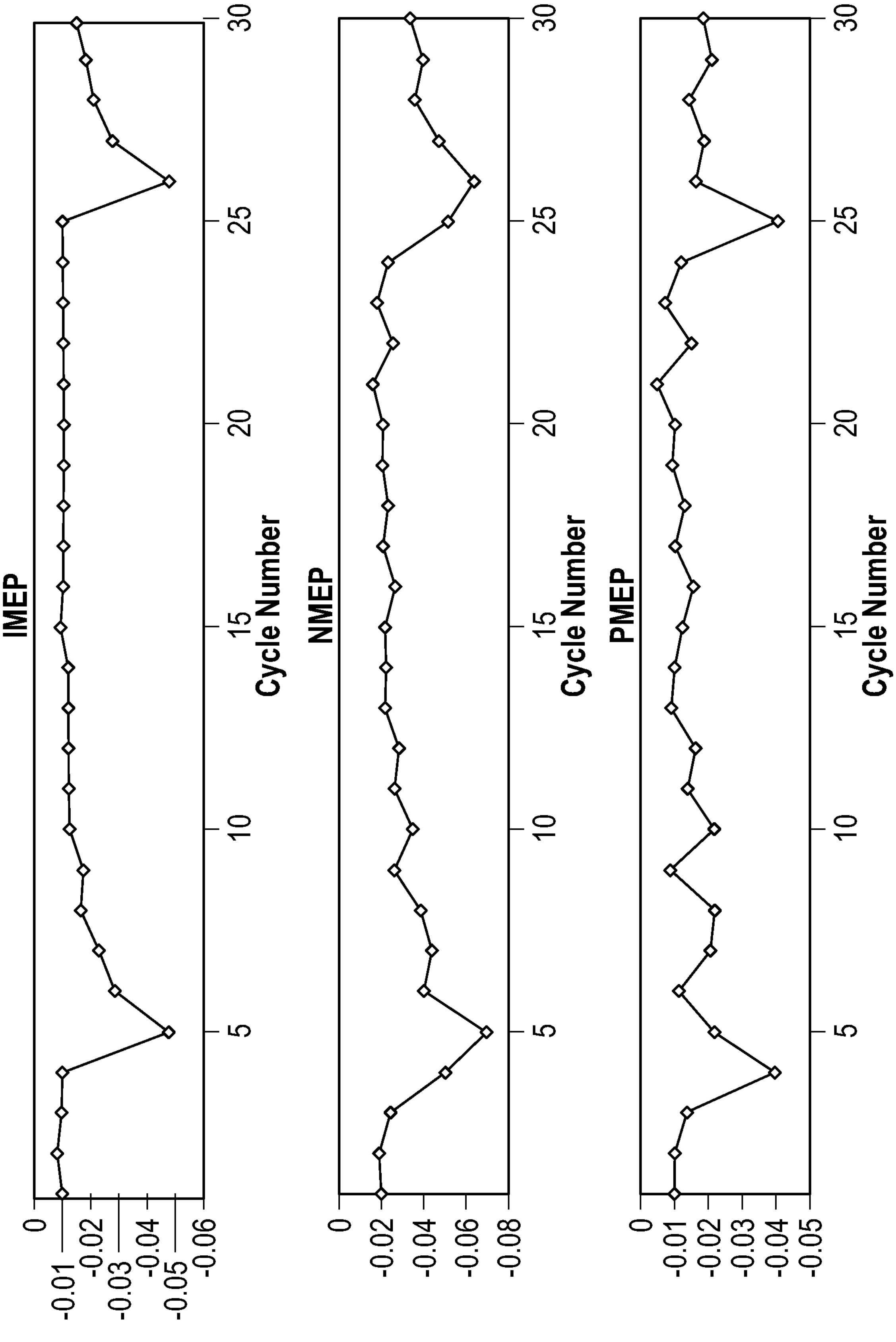
Figure 6:
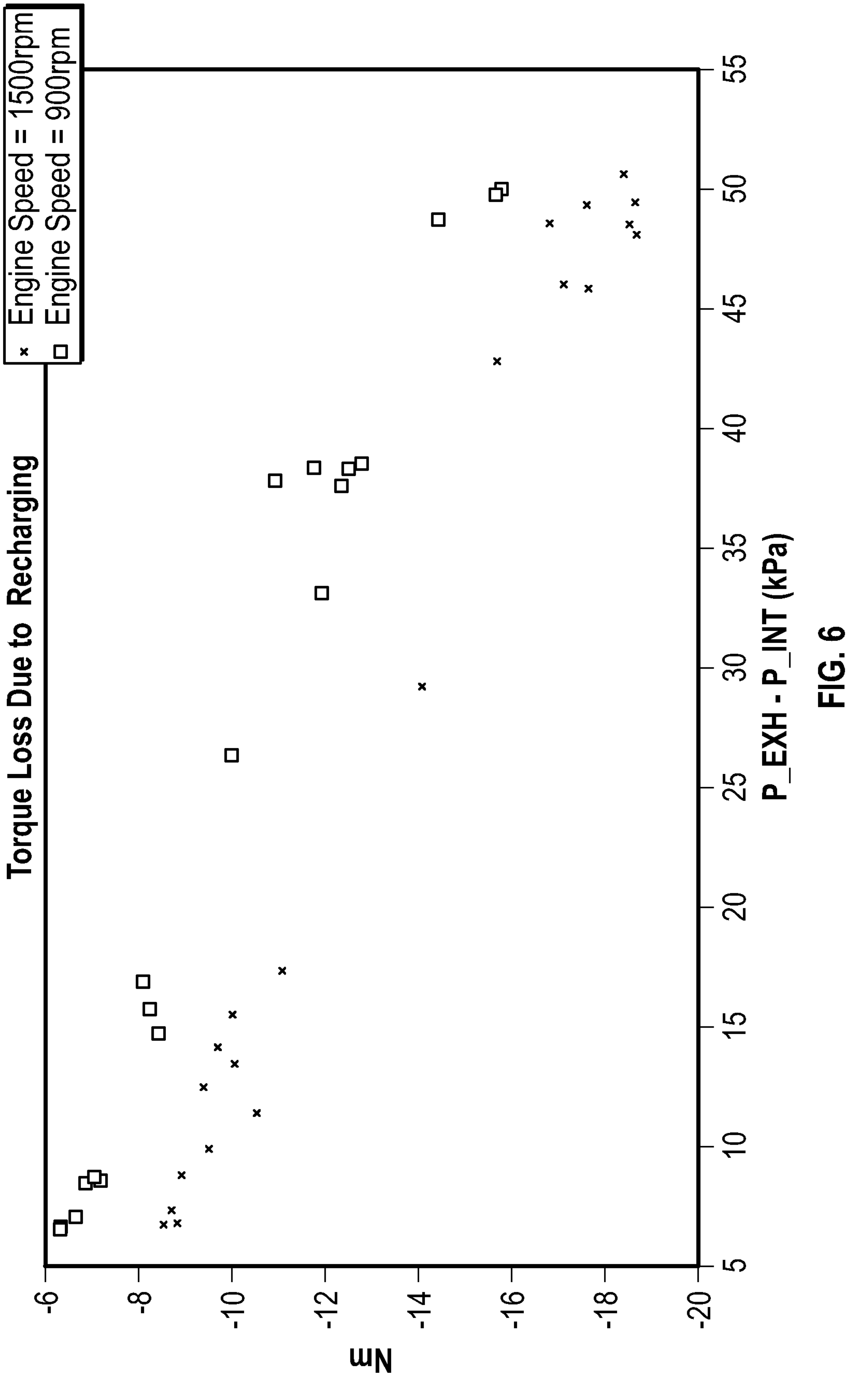
FIG. 6 shows an estimate of torque pumping loss during recharging.

As illustrated in FIG. 5A, the recharging event generally will cause a known negative (braking) torque due to pumping loss. FIG. 5A shows data at 900 rpm, a 200 Nm brake torque, and a FF of 2/3. As shown in FIG. 5A, for each recharging event, there is a brake torque hit/loss of approximately 36 Nm. FIG. 5B shows in-cylinder pressure data vs cycle number. As shown in FIG. 5B, the recharging torque loss results from pumping loss (shown from PMEP in the skipped cylinder) and from air spring loss due to heat transfer (shown from IMEP in the skipped cylinder). The torque loss from recharging event can be predicted by the difference of exhaust manifold pressure and intake manifold pressure. FIG. 6 shows this correlation.

As shown in FIG. 6, the exhaust and intake manifold pressure difference correlates with the recharging pumping losses (when the engine is pumping air). Therefore, this pressure difference could be used to estimate the pumping loss due to recharging. Both of these pressures can be read from the corresponding ECM pressure sensors. A 2D look-up table could be used to estimate the torque loss based on engine speed and the difference between exhaust manifold pressure and intake manifold pressure. FIG. 11 shows a sample table.

In another embodiment, a feedforward fueling command can be coordinated with the recharging-event to keep overall average torque at the target level. One way to do this is to add a net fueling offset based on the estimated pumping loss during the recharging event.

The braking torque due to the recharging event can cause an increase in the amount of NVH arising from the skip-fire operation of the engine. The negative torque will cause a low frequency vibration that may be noticed by the vehicle occupants. This can sometimes be reduced by properly timing the recharge events, or the fueling offset can be distributed over several cylinder firing events, and each event can have a different part of the offset in order to reduce the additional NVH. The distribution can even be done in such a fashion that some cylinders see a reduction in fueling. This provides a flexibility to shape the torque response to reduce the additional NVH from the recharge event.

In most four-stroke engines, cylinders operate in pairs with one cylinder of the pair in its power phase, while the second of the pair is in its intake phase. This offers an opportunity to schedule the recharge of a cylinder (which causes a negative torque on the crankshaft) at the same time that torque is being generated by the other cylinder in the pair. The resulting torque applied to the crankshaft will be smoother than if the recharge is at a different time, resulting in reduced NVH. For example, with a ¼ firing fraction in a six-cylinder engine, three cylinders are deactivated, and three cylinders alternately skip one working cycle and then fired on the next working cycle. In FIG. 12, the three deactivated cylinders are recharged every twelve engine cycles, with the recharge event scheduled for cylinder 4 occurring while cylinder 1 is firing, and likewise cylinder 2 recharges as cylinder 5 fires, and cylinder 6 recharges as cylinder 3 fires. In this manner, each recharge event, with its subsequent reduction in torque at the crankshaft, occurs simultaneously with the delivery of torque to the crankshaft from a firing cylinder. The result is an improvement in the NVH arising from the requirement to recharge the cylinders. To further reduce the NVH, the net fuel increase to offset the additional pumping work of recharging the cylinder can be divided among the firing cylinders. The fuel for each firing cylinder can be increased or decreased, with the total change in fueling for the cylinders increasing to compensate for the pumping losses incurred by recharging.

Another negative impact from the recharging event is an EGR increase for the firing cylinders. Specifically, the recharging event can increase the exhaust manifold pressure because of increased exhaust mass flow. The recharging event also can decrease the intake manifold pressure due to the recharged cylinder drawing down the pressure in the intake manifold, which can increase the pressure difference between the exhaust manifold and intake manifold, thereby increasing the EGR flow. In order to keep the same required EGR fraction for the firing cylinders, a feedforward EGR valve command can be coordinated with the recharging event to maintain the EGR fraction at the target level, thereby mitigating the disturbance of EGR flow. This also changes the composition of the exhaust by diluting it with gas from the intake manifold.

In another embodiment, the cylinder with the longest deactivation time (the elapsed time since firing/recharging can be selected as the first cylinder to be recharged. Alternatively, the cylinders can be recharged in an order based on length of time since the last fire.

Figure 7:
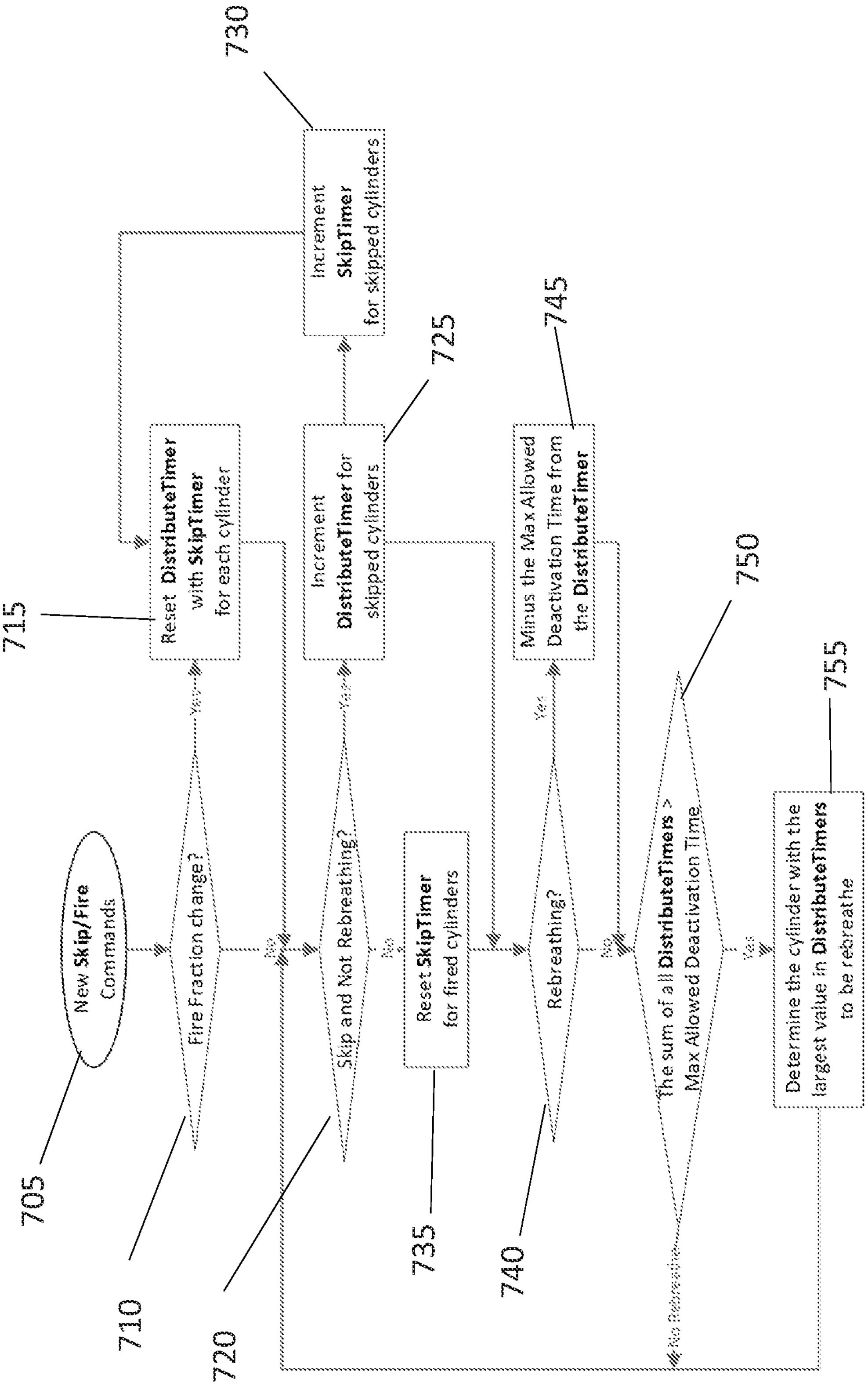
FIG. 7 shows a recharging logic flowchart of another embodiment.

In another embodiment, the time of consecutive deactivated cylinders is accumulated. In this embodiment, shown in FIG. 7, it is determined whether recharging is required and which cylinder should be selected for the recharging. For example, when a recharging event is required, the cylinder with the longest deactivation time can be commanded to recharge. This embodiment can be used during any type of firing pattern and during transition and rolling patterns. As shown in FIG. 7, the new Skip/Fire Commands are input to the flow diagram at Step 705. When a cylinder is being skipped and is not being recharged (Yes in Step 720), the deactivation time for each skipped cylinder is incremented in SkipTimer at Step 730. The DistributeTimer for skipped cylinders is also incremented in Step 725. The DistributeTimer is used to determine which cylinder will be triggered for the next recharging event, so that the recharged cylinders are distributed evenly, as shown in more detail below. The SkipTimer is reset to 0 at Step 735 for cylinders that are fired or recharged (No in Step 720). The DistributeTimer is reset to the SkipTimer at Step 715 if there is any firing fraction change (Yes at Step 710). When there is a recharging command for a cylinder (Yes at Step 740), the maximum allowed deactivation time is subtracted from the DistributeTimer at Step 745. At Step 750, if the sum of the DistributeTimers for all of the cylinders is greater than the maximum allowed deactivation time, it is determined that a recharging (recharging) event is necessary. When it is determined that a recharging event is necessary, the cylinder with the largest deactivation time is commanded to recharge (Step 755).

FIGS. 13A and 13B illustrate two examples of how the flowchart of FIG. 7 operates.

For multiple recharging cylinders, the recharging commands are distributed in accordance with a maximum number of allowed [calibrated] recharging events per engine cycle. The maximum number of allowed recharging events term can be a static parameter stored in the memory 16A. Alternatively, the maximum number of allowed recharging events can be a dynamic value that can be determined in a look-up table stored in the memory 16A. The inputs to the look up table may be engine speed, desired torque, a modeled or measured in-cylinder pressure for the deactivated cylinder(s), a modeled or measured in-cylinder wall temperature for the deactivated cylinder(s), modelized or measured NVH impact of recharging torque loss.

To avoid possible recharges commanded during rolling patterns, a fire density mask model can be created. This fire density mask model can also allow the consecutive deactivation time of a deactivated cylinder to be accumulated continuously no matter what patterns are running, for example transition. During the period when a masked FF is running, the recharging events are disabled. For example, if 1/7 is one of the masked fire fractions, no recharging command is scheduled after engine is switched to run at FF=1/7, even if the sum of all DistributeTimer is larger than the threshold (Maximum Allowed Time). Both SkipTimer and DistributeTimer continue to increment normally, but the recharging commands are disabled.

Recently, the emission requirements for diesel engines have become more stringent. In order to meet these stringent emission requirements, it is necessary to maintain the exhaust after-treatment system at a high temperature. One way to do this is use cylinder deactivation, which can be used to increase the temperature of one or more after-treatment elements in the exhaust system. Also, as presented above, cylinder recharging can be used to avoid prolonged periods of low in-cylinder pressure, thereby preventing the intrusion of oil into the cylinder, which could further degrade emissions in a diesel engine.

Another use of recharging coincides with re-firing a cylinder, by which is meant to fuel and fire the cylinder after a least one cycle on which it was skipped. Because the charge in the cylinder cools each time the cylinder is skipped, it can impair or prevent combustion of the firing event if it is not first recharged, either by first expelling the current charge (re-exhausting) and inducting a new charge (re-intaking), or keeping the current charge but inducting additional gasses from the intake manifold (re-intaking) and then fueling and firing the cylinder.

As presented above, in at least one embodiment, the maximum allowed deactivation time can be determined by modeling a current in-cylinder pressure based on current engine conditions, updating the modeled in-cylinder pressure each engine cycle, and computing a time when the in-cylinder pressure will be at or below a minimum in-cylinder pressure.

In another embodiment, the maximum allowed deactivation time is computed at the time of firing, or at least one engine cycle in advance of cylinder recharging so that a number of cylinders recharging during one engine cycle does not exceed a predetermined amount. In some embodiments, the maximum allowed deactivation time is determined by estimating a current in-cylinder pressure and a minimum in-cylinder pressure based on current engine conditions, calculating a decay rate of the cylinder pressure, and computing a time when the in-cylinder pressure will be at or below the minimum in-cylinder pressure.

In other embodiments, the recharging of a cylinder further comprises re-exhausting the cylinder on a prior engine cycle followed by re-intaking air into the cylinder or re-intaking air into the cylinder and not re-exhausting the cylinder prior to injecting fuel into the cylinder. In another embodiment the maximum allowed deactivation time is a maximum allowed number of engine cycles. In other embodiments, whether the cylinder is re-exhausted prior to recharging is determined based on the modeled current in-cylinder pressure.

In another embodiment, an amount of fuel injected is determined based on a current in-cylinder pressure. The current in-cylinder pressure provides an upper limit on the amount of fuel that can be combusted in the cylinder without producing an unacceptable amount of unburned hydrocarbons, or the recharging is done in more than one engine cycle.

In another embodiment, a maximum allowed deactivation time for a set of cylinders that are deactivated is determined, the cylinders are recharged when the maximum allowed deactivation time is exceeded, and the recharging of the cylinders is coordinated so that recharging of the cylinders is spaced in different engine cycles. In another embodiment, the cylinders are recharged based upon a length of time since a prior recharge or firing, or the length of time depends on whether a prior event was a recharge or fire.

In another embodiment, feedforward control to an EGR valve command is coordinated with the recharging event in order to maintain an EGR fraction. In another embodiment, a fueling increase or decrease is added to other firing cylinders based on an estimated pumping loss of a recharge event.

In another embodiment, a fixed set of X cylinders are deactivated, a maximum allowed deactivation time N for the set of cylinders that are deactivated is determined, and every $M^{th}$ deactivated cylinder event is recharged, wherein $M<N$, and M is coprime with X. In another embodiment, an accumulated deactivation time for all cylinders is determined and a cylinder is recharged when the accumulated deactivation time exceeds a threshold.

In another embodiment, an accumulated deactivation time for all cylinders is determined, cylinders to be recharged when the accumulated deactivation time exceeds a threshold are selected, and when multiple cylinders are selected to be recharged, the recharging of the cylinders selected to be recharged are evenly distributed over more than one engine cycle. In another embodiment, recharging commands are distributed in accordance with a maximum number of calibrated recharging events per engine cycle.

In another embodiment, a cylinder having a longest deactivation time is prioritized for recharging. In still another embodiment, only one cylinder is recharged in one engine cycle. In another embodiment, the accumulated deactivation time and maximum allowed deactivation time are computed based on an accumulated number of engine strokes. In another embodiment, the maximum allowed deactivation time depends on intake manifold pressure.

The above described methods can be performed by an engine controller or by instructions recorded on a non-transitory, computer-readable medium.

It should be understood that the invention is not limited by the specific embodiments described herein, which are offered by way of example and not by way of limitation. Variations and modifications of the above-described embodiments and its various aspects will be apparent to one skilled in the art and fall within the scope of the invention, as set forth in the following claims.

What is claimed is:

1. A method for managing recharging of cylinders of an internal combustion engine during skip fire operation of the engine, the method comprising:

determining a maximum allowed deactivation time for a cylinder; and recharging the cylinder, without combustion, before the maximum allowed deactivation time is exceeded.

2. The method of claim 1, wherein determining the maximum allowed deactivation time comprises modeling a current in-cylinder pressure based on current engine conditions, updating the modeled in-cylinder pressure each engine cycle, and computing a time when the in-cylinder pressure will be at or below a minimum in-cylinder pressure.

3. The method of claim 2, wherein the maximum allowed deactivation time is computed at least one engine cycle in advance of cylinder recharging so that a number of cylinder rechargings in an engine cycle does not exceed a predetermined amount.

4. The method of claim 1, wherein determining the maximum allowed deactivation time comprises estimating a current in-cylinder pressure and a minimum in-cylinder pressure based on current engine conditions, calculating a decay rate of the cylinder pressure, and computing a time when the in-cylinder pressure will be at or below the minimum in-cylinder pressure.

5. The method of claim 1, wherein the recharging of a cylinder comprises exhausting the cylinder and reintaking air into the cylinder.

6. The method of claim 1, wherein the recharging of a cylinder comprises reintaking air into the cylinder and not exhausting the cylinder.

7. The method of claim 1, wherein the maximum allowed deactivation time is a maximum allowed number of engine cycles.

8. The method of claim 5, wherein a type of recharging is determined based on a modeled current in-cylinder pressure.

9. The method of claim 1, wherein an amount of fuel injected is determined based on a current in-cylinder pressure.

10. The method of claim 1, wherein the recharging is done in more than one engine cycle.

11. An engine controller in an internal combustion engine operated in a skip fire manner, the engine controller configured to:

determine a maximum allowed deactivation time for a cylinder; and recharge the cylinder, without combustion, before the maximum allowed deactivation time is exceeded.

12. The engine controller of claim 11, wherein the engine controller is further configured to:

determine the maximum allowed deactivation time by modeling a current in-cylinder pressure based on current engine conditions;

update the modeled in-cylinder pressure each engine cycle; and compute a time when the in-cylinder pressure will be at or below a minimum in-cylinder pressure.

13. A non-transitory, computer-readable medium having instructions recorded thereon which, when executed by a processor, cause the processor to:

determine a maximum allowed deactivation time for a cylinder; and recharge the cylinder, without combustion, before the maximum allowed deactivation time is exceeded.

14. The non-transitory, computer-readable medium of claim 13, wherein the instructions further cause the processor to:

determine the maximum allowed deactivation time by modeling a current in-cylinder pressure based on current engine conditions;

update the modeled in-cylinder pressure each engine cycle; and compute a time when the in-cylinder pressure will be at or below a minimum in-cylinder pressure.

15. A method for managing recharging of cylinders of an internal combustion engine during skip fire operation of the engine, the method comprising:

determining a maximum allowed deactivation time for a set of cylinders that are deactivated, the maximum allowed deactivation time being a number of revolutions of the engine;

recharging the cylinders when the maximum allowed deactivation time is exceeded; and coordinating the recharging of the cylinders so that recharging of the cylinders is spaced in different engine cycles.

16. The method of claim 15, wherein the cylinders are recharged based upon a length of time since a prior recharging working cycle or firing working cycle.

17. The method of claim 16, wherein the length of time depends on whether a prior event was a recharge or fire.

18. The method of claim 15, further comprising coordinating a feedforward control to an EGR valve command with the recharging in order to maintain an EGR fraction.

19. The method of claim 15, further comprising increasing or decreasing a fueling level in other firing cylinders based on an estimated pumping loss of a recharge event.

20. A method for managing recharging of cylinders of an internal combustion engine in which a fixed set of X cylinders are deactivated, the method comprising:

determining a maximum allowed deactivation time N for the set of cylinders that are deactivated, the maximum allowed deactivation time N being a maximum number of skipped cylinder events; and recharging every Mth skipped cylinder, wherein M<N, and M is coprime with X and selected to minimize a number of recharging of deactivated cylinders.

21. An engine controller in an internal combustion engine operated in a skip fire manner, the engine controller configured to:

determine a maximum allowed deactivation time for a set of cylinders that are deactivated based on a function of a number of engine revolutions;

recharge the cylinders before the maximum allowed deactivation time is exceeded; and coordinate the recharging of the cylinders so that recharging of the cylinders is spaced in different engine cycles such that at most one deactivated cylinder is recharged in each engine cycle.

22. An engine controller in an internal combustion engine in which a fixed set of X cylinders are deactivated, the engine controller configured to:

determine a maximum allowed deactivation time N for the set of cylinders that are deactivated, the maximum allowed deactivation time N being a maximum number of skipped cylinder events; and recharge every Mth skipped cylinder, wherein M<N, and M is coprime with X and selected to minimize a number of recharging of deactivated cylinders.

23. A method for managing recharging cylinders of an internal combustion engine during skip fire operation of the engine, the method comprising:

determining an accumulated deactivation time for all deactivated cylinders based on a number of engine revolutions; and recharging a single one of the deactivated cylinders when the accumulated deactivation time exceeds a threshold.

24. A method for managing recharging of cylinders of an internal combustion engine during skip fire operation of the engine, the method comprising:

determining an accumulated deactivation time for all deactivated cylinders based on a number of engine cycles;

selecting cylinders to be recharged when the accumulated deactivation time exceeds a threshold; and evenly distributing recharging of the cylinders selected to be recharged over more than one engine cycle when multiple cylinders are selected to be recharged.

25. The method for managing recharging of cylinders of claim 24, wherein recharging commands are distributed in accordance with a maximum number of calibrated recharging events per engine cycle.

26. The method of claim 23, wherein a cylinder having a longest deactivation time is prioritized for recharging.

27. The method of claim 23, wherein a maximum of one cylinder is recharged in each engine cycle.

28. The method of claim 23, wherein the accumulated deactivation time and maximum allowed deactivation time are computed based on an accumulated number of engine strokes.

29. The method of claim 27, wherein the maximum allowed deactivation time depends on intake manifold pressure.

30. An engine controller in an internal combustion engine operated in a skip fire manner, the engine controller configured to:

determine an accumulated deactivation time for all deactivated cylinders based on a number of engine revolutions; and recharge a single one of the deactivated cylinders before the accumulated deactivation time exceeds a threshold.

31. An engine controller in an internal combustion engine operated in a skip fire manner, the engine controller configured to:

determine an accumulated deactivation time for all deactivated cylinders based on a number of engine cycles;

select cylinders to be recharged when the accumulated deactivation time exceeds a threshold; and evenly distribute recharging of the cylinders selected to be recharged over more than one engine cycle when multiple cylinders are selected to be recharged.

32. The method of claim 1, wherein the recharging occurs simultaneously with delivery of torque from a firing cylinder.

33. The method of claim 5, wherein the recharging further comprises inducting gas into the cylinder.

34. The method of claim 6, wherein the recharging further comprises inducting gas into the cylinder.

35. The method of claim 6, further comprising determining a type of recharging based on a modeled current in-cylinder pressure.

36. A method for managing recharging of cylinders of a compression ignition engine during variable displacement operation of the engine, the method comprising:

determining a maximum allowed deactivation time for a cylinder; and recharging the cylinder, without combustion, before the maximum allowed deactivation time is exceeded.

37. A method for managing recharging of cylinders of an internal combustion engine during variable displacement operation of the engine, the method comprising:

determining a maximum allowed deactivation time for a cylinder; and recharging the cylinder, without combustion, before the maximum allowed deactivation time is exceeded.

* * * * *